(12) United States Patent
Kim et al.

(10) Patent No.: US 11,004,451 B2
(45) Date of Patent: May 11, 2021

(54) SYSTEM FOR PROCESSING SOUND DATA AND METHOD OF CONTROLLING SYSTEM

(71) Applicant: Samsung Electronics Co., Ltd., Gyeonggi-do (KR)

(72) Inventors: Taegu Kim, Gyeonggi-do (KR); Sangyong Park, Gyeonggi-do (KR); Jungwook Park, Gyeonggi-do (KR); Dale Noh, Gyeonggi-do (KR); Dongho Jang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 122 days.

(21) Appl. No.: 16/299,814

(22) Filed: Mar. 12, 2019

(65) Prior Publication Data
US 2019/0287525 A1    Sep. 19, 2019

(30) Foreign Application Priority Data

Mar. 19, 2018 (KR) .......................... 10-2018-0031472

(51) Int. Cl.
*G10L 15/22* (2006.01)
*G10L 15/06* (2013.01)
(Continued)

(52) U.S. Cl.
CPC ............ *G10L 15/22* (2013.01); *G10L 15/063* (2013.01); *G10L 15/1815* (2013.01);
(Continued)

(58) Field of Classification Search
CPC .......... G10L 15/22; G10L 15/30; G06F 3/167
See application file for complete search history.

(56) References Cited

U.S. PATENT DOCUMENTS 9,502,029 B1 * 11/2016 Bell ........................ G10L 15/22
9,799,329 B1    10/2017 Pogue et al.
(Continued)

FOREIGN PATENT DOCUMENTS

KR    10-2004-0053393    6/2004
KR    10-2016-0070029    6/2016
(Continued)

OTHER PUBLICATIONS

European Search Report dated Jul. 25, 2019 issued in counterpart application No. 19163797.4-1207, 11 pages.
(Continued)

*Primary Examiner* — Daniel Abebe
(74) *Attorney, Agent, or Firm* — The Farrell Law Firm, P.C.

(57) ABSTRACT

A system, a user terminal, a method of the system, a method of the user terminal, and a computer program product are provided. The system includes a communication interface, at least one processor operatively coupled to the communication interface, and at least one piece of memory operatively coupled to the at least one processor, wherein the at least one piece of memory is configured to store instructions configured for the at least one processor to receive sound data from a first external device through the communication interface, obtain a voice signal and a noise signal from the sound data using at least some of an automatic voice recognition module, change the voice signal into text data, determine a noise pattern based on at least some of the noise signal, and determine a domain using the text data and the noise pattern when the memory operates.

18 Claims, 17 Drawing Sheets

(51) Int. Cl.
  *G10L 15/18* (2013.01)
  *G10L 15/30* (2013.01)
  *G10L 25/84* (2013.01)
  *G10L 25/48* (2013.01)
  *G10L 25/51* (2013.01)

(52) U.S. Cl.
  CPC .............. *G10L 15/30* (2013.01); *G10L 25/48* (2013.01); *G10L 25/51* (2013.01); *G10L 25/84* (2013.01); *G10L 2015/223* (2013.01); *G10L 2015/226* (2013.01); *G10L 2015/228* (2013.01); *H04M 2250/74* (2013.01)

(56) References Cited

U.S. PATENT DOCUMENTS

| | | | |
|---|---|---|---|
| 2006/0184370 A1 | 8/2006 | Kwak et al. | |
| 2006/0229873 A1* | 10/2006 | Eide | G10L 15/22 704/260 |
| 2011/0184724 A1* | 7/2011 | Ranjan | G10L 15/20 704/9 |
| 2012/0242501 A1 | 9/2012 | Tran et al. | |
| 2012/0323557 A1* | 12/2012 | Koll | G06F 3/04817 704/8 |
| 2014/0039888 A1* | 2/2014 | Taubman | G10L 15/183 704/235 |
| 2014/0163976 A1 | 6/2014 | Park et al. | |
| 2014/0278388 A1 | 9/2014 | Watson et al. | |
| 2016/0378747 A1* | 12/2016 | Orr | G06F 40/30 704/9 |
| 2017/0076724 A1* | 3/2017 | Park | G10L 15/08 |
| 2017/0357478 A1 | 12/2017 | Piersol et al. | |
| 2018/0061409 A1* | 3/2018 | Valentine | G10L 15/24 |
| 2018/0268735 A1 | 9/2018 | Jihn | |
| 2019/0266995 A1* | 8/2019 | Koll | G10L 15/183 |

FOREIGN PATENT DOCUMENTS

| | | |
|---|---|---|
| KR | 10-2016-0137008 | 11/2016 |
| KR | 1020170018140 | 2/2017 |
| KR | 1020180023702 | 3/2018 |

OTHER PUBLICATIONS

European Search Report dated Oct. 4, 2019 issued in counterpart application No. 19163797.4-1207, 11 pages.
International Search Report dated Mar. 21, 2019 issued in counterpart application No. PCT/KR2018/015677, 3 pages.

* cited by examiner

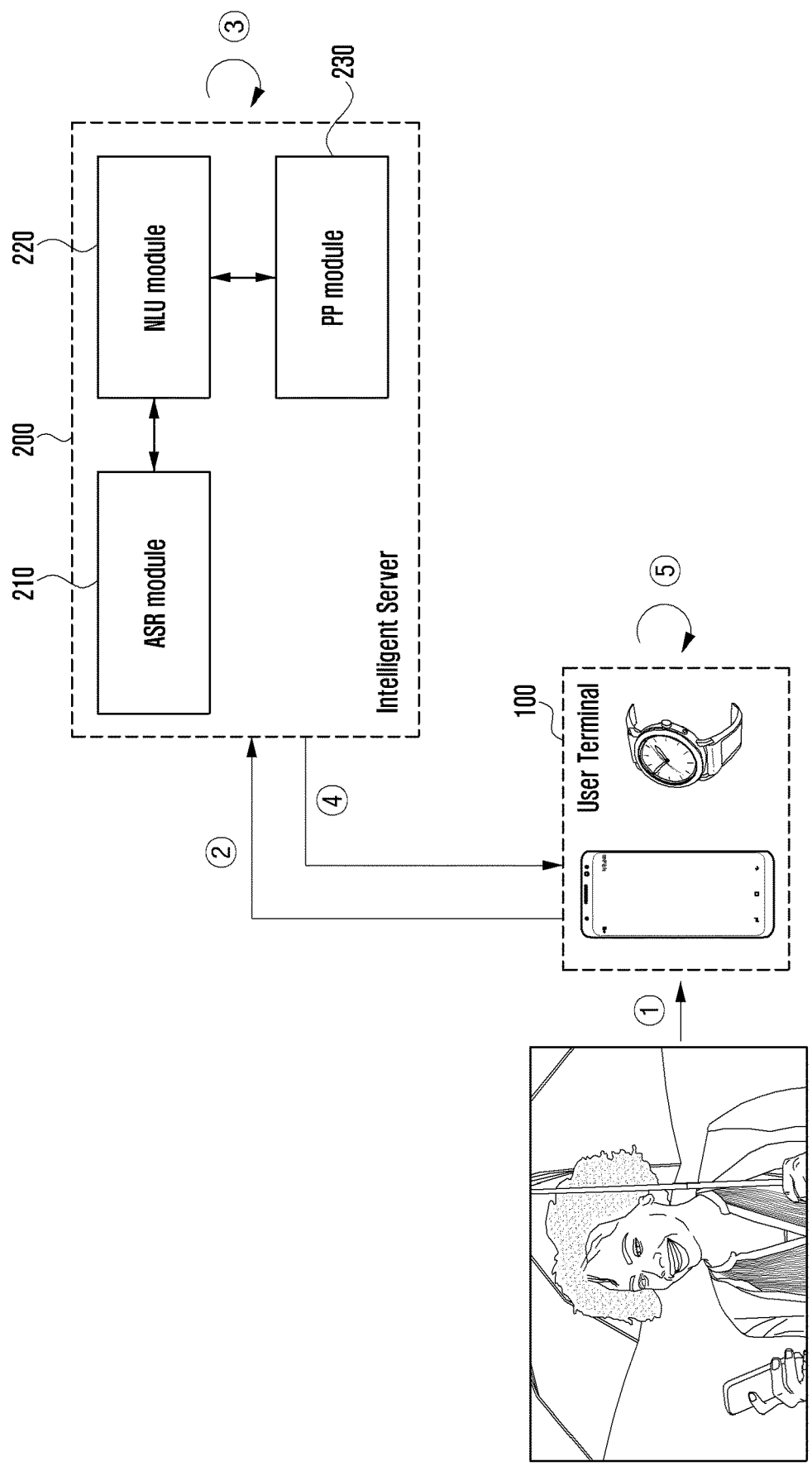

SYSTEM FOR PROCESSING SOUND DATA AND METHOD OF CONTROLLING SYSTEM

CROSS-REFERENCE TO RELATED APPLICATION(S)

This application is based on and claims priority under 35 U.S.C. § 119 to Korean Patent Application No. 10-2018-0031472, filed on Mar. 19, 2018, in the Korean Intellectual Property Office, the disclosure of which is incorporated by reference herein in its entirety.

BACKGROUND

1. Field

The present disclosure relates generally to a system for processing sound data including a voice of a user or noise and a method of controlling the system, and more particularly, to a system for providing a function to a user using information on an environment in which a voice is received when a function corresponding to contents of the received voice is executed.

2. Description of the Related Art

Recent electronic devices can support various input methods, such as a voice input, in addition to the existing input method using a keyboard or a mouse. For example, an electronic device, such as a smartphone or a tablet computer, may recognize a voice of a user input in a state in which a voice recognition service has been executed, and may execute an operation corresponding to the voice input or provide the results of a search corresponding to the voice input.

Recently, a voice recognition service was developed based on a technique for processing natural language. The technique for processing natural language is a technique for identifying the intent of a user's speech and providing the user with results suitable for the intent.

Furthermore, an artificial intelligence system is used as one of the techniques for processing natural language. Unlike the existing rule-based smart system, an artificial intelligence system is a system in which a machine autonomously performs training, makes a determination and increases its intelligence. An artificial intelligence system can obtain a higher recognition rate and understand a user's taste more accurately the more the system is used. Accordingly, the existing rule-based smart system is gradually substituted with a deep learning-based artificial intelligence system.

The artificial intelligence technology consists of machine learning (e.g., deep learning) and element technologies using machine learning.

Machine learning is an algorithm technology which autonomously identifies/trains features of input data. Element technologies are technologies which simulate functions, such as recognition and determination by a human brain, using a machine learning algorithm such as deep learning, and include technical fields, such as linguistic understanding, visual understanding, inference/prediction, knowledge expressions and operation control.

Various fields in which artificial intelligence technology is applied are as follows. Linguistic understanding is a technology for recognizing, applying and processing a human's languages/letters, and includes natural language processing, machine translation, a dialogue system, question and answer, and voice recognition/synthesis. Visual understanding is a technology for recognizing and processing a thing like a human's point of view, and includes object recognition, object tracking, image search, person recognition, scene understanding, space understanding, and image enhancement. Inference prediction is a technology for determining, logically inferring and predicting information, and includes knowledge/probability-based inference, optimization prediction, a preference-based plan, and recommendation. Knowledge expression is a technology for automating and processing a human's experience information as knowledge data, and includes a knowledge construction (e.g., data generation/classification) and knowledge management (e.g., data utilization). Operation control is a technology for controlling the autonomous driving of a vehicle and a motion of a robot, and includes motion control (e.g., navigation, collision and driving), and manipulation control (e.g., behavior control).

In an intelligent service such as a voice recognition function, when a voice is received and a function is executed by recognizing the contents of the received voice, the function may be performed without considering the situation in which the voice is received.

SUMMARY

The present disclosure provides a function to a user using information on an environment in which a voice is received when a function corresponding to the contents of the received voice is executed.

In accordance with an aspect of the present disclosure, a system is provided. The system includes a communication interface, at least one processor operatively coupled to the communication interface, and at least one piece of memory operatively coupled to the at least one processor, wherein the at least one piece of memory is configured to store instructions configured for the at least one processor to receive sound data from a first external device through the communication interface, obtain a voice signal and a noise signal from the sound data using at least some of an automatic voice recognition module, change the voice signal into text data, determine a noise pattern based on at least some of the noise signal, and determine a domain using the text data and the noise pattern when the memory operates.

In accordance with another aspect of the present disclosure, a user terminal is provided. The user terminal includes an input module; memory; and a processor, wherein the memory is configured to store instructions configured for the processor to generate a path rule obtained by estimating contents of audio data by applying the audio data, comprising a voice signal and an environmental sound signal received through the input module, to a training model trained using an artificial intelligent algorithm, wherein the training model is configured to generate the path rule using a pattern of the environmental sound signal obtained from the environmental sound signal, and wherein the training model is configured to generate the path rule by estimating the contents of the audio data trained using at least one of the audio data, the contents of the audio data, characteristics of the audio data, and a path rule corresponding to the audio data as training data.

In accordance with another aspect of the present disclosure, a method of a system is provided. The method includes receiving sound data from a first external device, obtaining a voice signal and a noise signal from the sound data, changing the voice signal into text data, determining a noise pattern based on at least some of the noise signal, and determining a domain using the text data and the noise pattern.

In accordance with another aspect of the present disclosure, a method of a user terminal is provided. The method includes receiving audio data comprising a voice and an environmental sound; and generating a path rule using a pattern of the environmental sound signal obtained from the environmental sound signal in a situation in which the path rule is obtained by estimating contents of the audio data by applying the audio data to a training model, wherein the training model is configured to generate the path rule by estimating the contents of the audio data applied to the training model using at least one of the audio data, the contents of the audio data, characteristics of the audio data, and the path rule corresponding to the audio data as training data.

In accordance with another aspect of the present disclosure, a computer program product including a non-transitory computer-readable recording medium in which instructions for executing operations in a computer are stored is provided. The operations include receiving sound data from a first external device; obtaining a voice signal and a noise signal from the sound data; changing the voice signal into text data; determining a noise pattern based on at least some of the noise signal; and determining a domain using the text data and the noise pattern.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 10A is a block diagram illustrating a situation in which a function is executed using a voice and an environmental sound input to a user terminal in an integrated intelligence system according to an embodiment;

DETAILED DESCRIPTION

Figure 1:
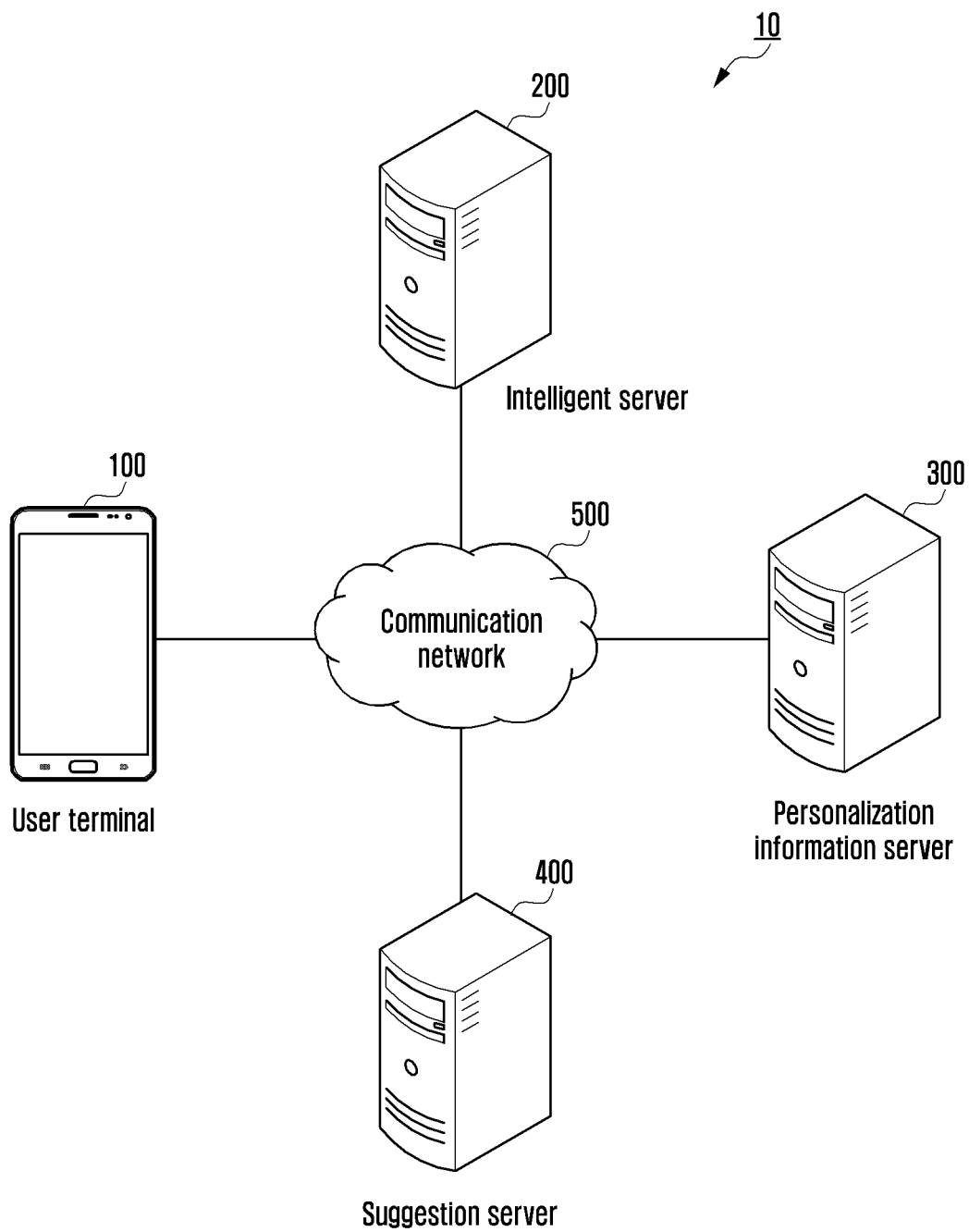
FIG. 1 is an illustration of an integrated intelligence system according to an embodiment.

An electronic device according to various embodiments disclosed in the present disclosure may be various forms of devices. The electronic device may include at least one of a portable communication device (e.g., a smartphone), a computer device, a portable multimedia device, a portable medical device, a camera, a wearable device, a server or home appliances, for example. The electronic device according to an embodiment of the present disclosure is not intended to be limited to the above-described devices.

Various embodiments and terms used herein are not intended to be limited to a specific embodiment, but should be construed as including various modifications, equivalents and/or alternatives of a corresponding embodiment. Regarding the description of the accompanying drawings, similar reference numerals may be used for similar elements. An expression of the singular number may include an expression of the plural number unless clearly defined otherwise in the context. In the present disclosure, an expression, such as "A or B", "at least one of A and/or B", "A, B or C" or "at least one of A, B and/or C", may include all of the possible combinations of the listed items together. Expressions, such as "a first," "a second," "the first" and "the second", may modify corresponding elements regardless of the sequence and/or importance, and are used only to distinguish one element from the other element but do not limit corresponding elements. When it is described that one (e.g., a first) element is "operatively or communicatively coupled with" or "connected to" another (e.g., a second) element, it should be understood that one element is directly connected to the other element or may be connected to the other element through yet another element (e.g., a third element).

Various embodiments are described below with reference to the accompanying drawings.

Prior to the description of an embodiment, an integrated intelligence system to which an embodiment may be applied will be described.

FIG. 1 is an illustration of an integrated intelligence system 10 according to an embodiment.

Referring to FIG. 1, the integrated intelligence system 10 may include a user terminal 100, an intelligent server 200, a personalization information server 300, a suggestion server 400, or a communication network 500.

The user terminal 100 may provide a user with a required service through an app (or application program) (e.g., an alarm app, a message app or a picture (gallery) app) stored in the user terminal 100. For example, the user terminal 100 may execute and drive a different app through an intelligent app (or voice recognition app) stored in the user terminal 100. The user terminal 100 may receive a user input for executing the different app and executing an operation through the intelligent app of the user terminal 100. The user input may be received through a physical button, a touch pad, a voice input or a remote input, for example. In accordance with one embodiment, the user terminal 100 may correspond to various terminal devices (or electronic devices) capable of connecting to the Internet, such as a mobile phone, a smartphone, a personal digital assistant (PDA) or a notebook computer.

In accordance with one embodiment, the user terminal 100 may receive speech of a user as a user input. The user terminal 100 may receive the speech of the user and generate a command to drive an app based on the speech of the user. Accordingly, the user terminal 100 may drive the app using the command.

The intelligent server 200 may receive a user voice input from the user terminal 100 over the communication network 500, and may change the user voice input into text data. In an embodiment, the intelligent server 200 may generate (or select) a path rule based on the text data. The path rule may include information on an action (or operation) for performing a function of an app or information on a parameter necessary to execute the action. Furthermore, the path rule may include the sequence of the action of the app. The user terminal 100 may receive the path rule, may select an app according to the path rule, and may execute an action included in the path rule in the selected app.

In the present disclosure, in general, the term "path rule" may indicate a sequence of states in which an electronic device performs a task requested by a user, but is not limited thereto. In other words, the path rule may include information on a sequence of states. The task may be any action which may be provided by an intelligent app, for example. The task may include generating a schedule, transmitting a picture to a desired counterpart, or providing weather information. The user terminal 100 may perform the task by sequentially having one or more states (e.g., the action states of the user terminal 100).

In accordance with one embodiment, a path rule may be provided or generated by a rule-based model or an artificial intelligent (AI) system. The AI system may be a rule-based system, a neural network-based system (e.g., a feedforward neural network (FNN) or a recurrent neural network (RNN)), a combination thereof, or may be a different AI system. The path rule may be selected as a set of predefined path rules or may be generated in real time in response to a user request. For example, the AI system may select at least one of a plurality of predefined path rules or may generate a path rule dynamically (or in real time). Furthermore, the user terminal 100 may use a hybrid system so as to provide a path rule.

In accordance with one embodiment, the user terminal 100 may execute an action and display a screen, corresponding to a state of the user terminal 100 that has executed the action, on a display. For example, the user terminal 100 may execute the action but may not display the results of the execution of the action on the display. The user terminal 100 may execute a plurality of actions and display only the results of some of the plurality of actions on the display, for example. The user terminal 100 may display only the results of the execution of the action of the last sequence on the display, for example. For example, the user terminal 100 may receive a user's input and display the results of the execution of the action on the display.

The personalization information server 300 may include a database in which user information has been stored. For example, the personalization information server 300 may receive user information (e.g., context information and app execution) from the user terminal 100 and store the user information in the database. The intelligent server 200 may receive the user information from the personalization information server 300 over the communication network 500, and may use the received user information when it generates a path rule for a user input. In accordance with one embodiment, the user terminal 100 may receive user information from the personalization information server 300 over the communication network 500 and use the received user information as information for managing a database.

The suggestion server 400 may include a database in which the introduction of a function or app or information on a function to be provided has been stored within a terminal. For example, the suggestion server 400 may include a database for a function to be used by a user if user information of the user terminal 100 is received from the personalization information server 300. The user terminal 100 may receive the information on a function to be provided from the suggestion server 400 over the communication network 500, and may provide the information to the user.

Figure 2:
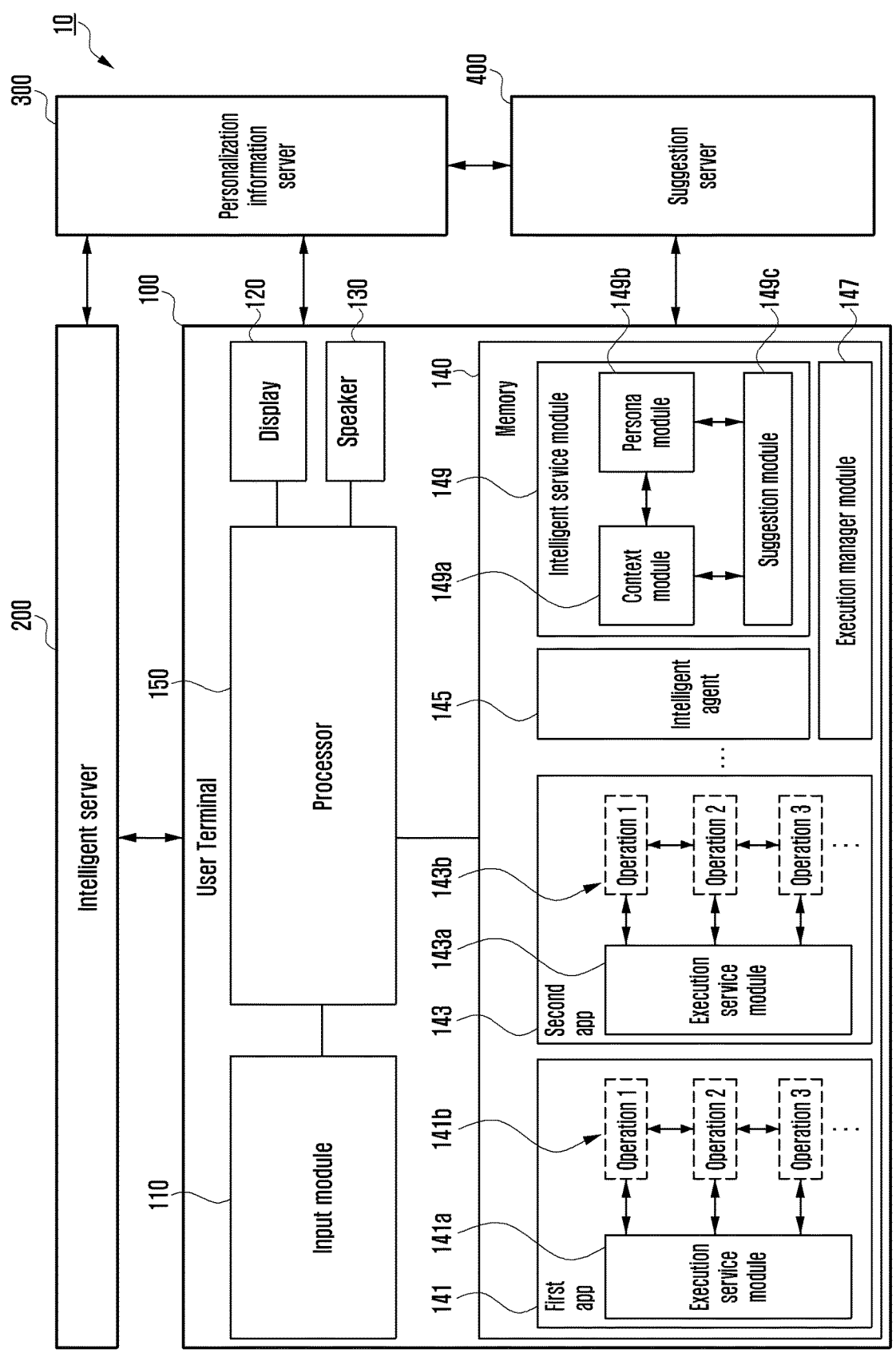
FIG. 2 is a block diagram of a user terminal of an integrated intelligence system according to an embodiment.

FIG. 2 is a block diagram of a user terminal of the integrated intelligence system 10 according to an embodiment.

Referring to FIG. 2, the user terminal 100 may include an input module 110, a display 120, a speaker 130, memory 140 or a processor 150. The user terminal 100 may further include a housing. The elements of the user terminal 100 may be seated in the housing or may be located on the housing. The user terminal 100 may further include a communication circuit located within the housing. The user terminal 100 may transmit and receive data (or information) to and from the intelligent server 200 through the communication circuit.

The input module 110 may receive a user input from a user. For example, the input module 110 may receive a user input from an external device (e.g., a keyboard or a headset) connected thereto. For example, the input module 110 may include a touch screen (e.g., touch screen display) combined with the display 120. For example, the input module 110 may include a hardware key (or physical key) located in the user terminal 100 (or the housing of the user terminal 100).

The input module 110 may include a microphone capable of receiving speech of a user as a voice signal. For example, the input module 110 includes a speech input system, and may receive speech of a user as a voice signal through the speech input system. The microphone may be exposed through a part (e.g., a first part) of the housing, for example.

The display 120 may display an execution screen of an image or video and/or an execution screen of an app. For example, the display 120 may display a graphical user interface (GUI) of an app. The display 120 may be exposed through a part (e.g., a second part) of the housing.

The speaker 130 may output a voice signal. For example, the speaker 130 may output a voice signal, generated within the user terminal 100, to the outside. The speaker 130 may be exposed through a part (e.g., a third part) of the housing.

The memory 140 may store a plurality of apps (or application programs) 141 (e.g., a first app) and 143 (e.g., a second app). The plurality of apps 141 and 143 may be programs for performing functions corresponding to a user's inputs, for example. The memory 140 may store an intelligent agent 145, an execution manager module 147 or an intelligent service module 149. The intelligent agent 145, the execution manager module 147 and the intelligent service module 149 may be frameworks (or application frameworks) for processing a received user input (e.g., user speech), for example.

The memory 140 may include a database for storing information required to recognize a user input. For example, the memory 140 may include a log database capable of storing log information. For example, the memory 140 may include a persona or database capable of storing user information.

The memory 140 stores the plurality of apps 141 and 143. The plurality of apps 141 and 143 may be loaded and driven. For example, the plurality of apps 141 and 143 stored in the memory 140 may be loaded and driven by the execution manager module 147. The plurality of apps 141 and 143 may include execution service modules 141a and 143a for performing functions. The plurality of apps 141 and 143 may execute a plurality of actions (e.g., the sequence of states) 141b and 143b (e.g., operation 1, operation 2, operation 3 . . . ) through the execution service modules 141a and 143a in order to perform functions. In other words, the execution service modules 141a and 143a may be enabled by the execution manager module 147, and may execute the plurality of actions 141b and 143b.

When the actions 141b, 143b of the apps 141, 143 are executed, execution state screens according to the execution of the actions 141b, 143b may be displayed on the display 120. The execution state screens may be screens of the states in which the actions 141b, 143b have been completed, for example. The execution state screens may be screens of the states in which the execution of the actions 141b, 143b have been stopped (i.e., partial landing) (e.g., when parameters necessary for the actions 141b, 143b are not input), for example.

The execution service modules 141a, 143a according to one embodiment may execute the actions 141b, 143b according to a path rule. For example, the execution service modules 141a, 143a may be enabled by the execution manager module 147, receive execution requests according to the path rule from the execution manager module 147, and execute functions of the apps 141, 143 by performing the actions 141b, 143b in response to the execution requests. When the executions of the actions 141b, 143b are completed, the execution service modules 141a, 143a may transmit completion information to the execution manager module 147.

When the plurality of actions 141b and 143b is executed in the apps 141 and 143, the plurality of actions 141b and 143b may be sequentially executed. When the execution of one operation (e.g., operation 1 of the first app 141 or operation 1 of the second app 143) is completed, the execution service modules 141a and 143a may open a next operation (e.g., operation 2 of the first app 141 or operation 2 of the second app 143), and may transmit completion information to the execution manager module 147. In this case, to open a given operation may be understood as changing the given operation to an executable state or preparing the execution of the given operation. In other words, when a given operation is not open, the corresponding action cannot be executed. When the completion information is received, the execution manager module 147 may transmit an execution request for a next operation (e.g., operation 2 of the first app 141 or operation 2 of the second app 143) to the execution service modules 141a, 143a. When the plurality of apps 141 and 143 is executed, the plurality of apps 141 and 143 may be sequentially executed. For example, when the execution of the last operation of the first app 141 (e.g., operation 3 of the first app 141) is completed and, thus, completion information is received, the execution manager module 147 may transmit an execution request for the first operation of the second app 143 (e.g., operation 1 of the second app 143) to the execution service module 143a.

When the plurality of actions 141b and 143b is executed in the apps 141 and 143, result screens according to the execution of the plurality of executed actions 141b and 143b, respectively, may be displayed on the display 120. Only some of a plurality of result screens according to the execution of the plurality of executed actions 141b and 143b may be displayed on the display 120.

The memory 140 may store an intelligent app (e.g., a voice recognition app) operating in conjunction with the intelligent agent 145. An app operating in conjunction with the intelligent agent 145 may receive speech of a user as a voice signal and process the speech. An app operating in conjunction with the intelligent agent 145 may be driven by a given input (e.g., an input through a hardware key, a touch screen or a given voice input) input through the input module 110.

The intelligent agent 145, the execution manager module 147 or the intelligent service module 149 stored in the memory 140 may be executed by the processor 150. The function of the intelligent agent 145, the execution manager module 147 or the intelligent service module 149 may be implemented by the processor 150. The functions of the intelligent agent 145, the execution manager module 147 and the intelligent service module 149 are described below as operations of the processor 150. The intelligent agent 145, the execution manager module 147 or the intelligent service module 149 stored in the memory 140 may be implemented by hardware in addition to software.

The processor 150 may control an overall operation of the user terminal 100. For example, the processor 150 may control the input module 110 to receive a user input. The processor 150 may control the display 120 to display an image. The processor 150 may control the speaker 130 to output a voice signal. The processor 150 may control the memory 140 to execute a program or fetch or store required information.

The processor 150 may execute the intelligent agent 145, the execution manager module 147 or the intelligent service module 149 stored in the memory 140. Accordingly, the processor 150 may implement the function of the intelligent agent 145, the execution manager module 147 or the intelligent service module 149.

The processor 150 may generate a command to drive an app based on a voice signal received as a user input by executing the intelligent agent 145. The processor 150 may execute the apps 141, 143 stored in the memory 140 in response to the generated commands by executing the execution manager module 147. The processor 150 may manage information of a user by executing the intelligent service module 149, and may process a user input using the information of the user.

The processor 150 may transmit a user input, received through the input module 110, to the intelligent server 200 by executing the intelligent agent 145, and may process the user input through the intelligent server 200.

The processor 150 may pre-process the user input before it transmits the user input to the intelligent server 200 by executing the intelligent agent 145 In order to pre-process the user input, the intelligent agent 145 may include an adaptive echo canceller (AEC) module, a noise suppression (NS) module, an end-point detection (EPD) module or an automatic gain control (AGC) module. The AEC module may cancel echo included in the user input. The NS module may suppress background noise included in the user input. The EPD module may detect the end of a user voice included in the user input, and may find out a portion where the voice of the user is present using the detected end. The AGC module may recognize the user input and adjust the volume of the user input so that it is suitable for processing the recognized user input. The processor 150 may execute all the pre-processing elements for performance. The processor 150 may execute some of the pre-processing elements in order to operate with low energy.

The intelligent agent 145 may execute a wakeup recognition module stored in the memory 140 in order to recognize a call from a user. Accordingly, the processor 150 may recognize the wakeup command of the user through the wakeup recognition module. When the wakeup command is received, the processor 150 may execute the intelligent agent 145 for receiving a user input. The wakeup recognition module may be implemented as a low-energy processor (e.g., a processor included in an audio data codec). When a user input through a hardware key is received, the processor 150 may execute the intelligent agent 145. When the intelligent agent 145 is executed, an intelligent app (e.g., a voice recognition app) operating in conjunction with the intelligent agent 145 may be executed.

The intelligent agent 145 may include a voice recognition module for executing a user input. The processor 150 may recognize a user input for enabling an action to be executed in an app through the voice recognition module. For example, the processor 150 may recognize a limited user (voice) input (e.g., speech, such as "click" to execute a photographing action, when a camera app is executed) for executing an action, such as the wakeup command, in the apps 141, 143 through the voice recognition module. The processor 150 may assist the intelligent server 200 to recognize a user command which may be processed in the user terminal 100 through the voice recognition module, and may rapidly process the user command. The voice recognition module of the intelligent agent 145 for executing a user input may be implemented by an app processor.

The voice recognition module (including the voice recognition module of a wakeup module) of the intelligent agent 145 may recognize a user input using an algorithm for recognizing a voice. The algorithm used to recognize a voice may be at least one of a hidden Markov model (HMM) algorithm, an artificial neural network (ANN) algorithm or a dynamic time warping (DTW) algorithm, for example.

The processor 150 may convert the voice input of a user into text data by executing the intelligent agent 145. For example, the processor 150 may transmit a voice of a user to the intelligent server 200 through the intelligent agent 145, and may receive text data corresponding to the voice of the user from the intelligent server 200. In response thereto, the processor 150 may display the converted text data on the display 120.

The processor 150 may receive a path rule from the intelligent server 200 by executing the intelligent agent 145. The processor 150 may deliver the path rule to the execution manager module 147 through the intelligent agent 145.

The processor 150 may transmit an execution result log according to a path rule, received from the intelligent server 200 by executing the intelligent agent 145, to the intelligent service module 149. The transmitted execution result log may be accumulated in preference information of a user of a persona module (or persona manager) 149b.

The processor 150 may receive a path rule from the intelligent agent 145 by executing the execution manager module 147, execute the apps 141, 143, and enable the apps 141, 143 to execute the actions 141b, 143b included in the path rule. For example, the processor 150 may transmit command information (e.g., path rule information) for executing the actions 141b, 143b to the apps 141, 143 through the execution manager module 147, and receive completion information of the actions 141b, 143b from the apps 141, 143.

The processor 150 may transmit command information (e.g., path rule information) for executing the actions 141b, 143b of the apps 141, 143 between the intelligent agent 145 and the apps 141, 143 by executing the execution manager module 147. The processor 150 may bind the apps 141 and 143 to be executed according to a path rule through the execution manager module 147, and may transmit command information (e.g., path rule information) of the actions 141b and 143b included in the path rule to the apps 141 and 143. For example, the processor 150 may sequentially execute the actions 141b and 143b of the apps 141 and 143 according to the path rule by sequentially transmitting the actions 141b and 143b included in the path rule to the apps 141 and 143 through the execution manager module 147.

The processor 150 may manage the execution state of the actions 141b, 143b of the apps 141, 143 by executing the execution manager module 147. For example, the processor 150 may receive information on the execution states of the actions 141b, 143b from the apps 141, 143 through the execution manager module 147. When the execution states of the actions 141b, 143b are partial landings (e.g., if a parameter necessary for the actions 141b, 143b has not been received), for example, the processor 150 may transmit information on the partial landing to the intelligent agent 145 through the execution manager module 147. The processor 150 may request a user to input required information (e.g., parameter information) using the information received through the intelligent agent 145. When the execution states of the actions 141b, 143b are action states, for example, the processor 150 may receive speech from a user through the intelligent agent 145. The processor 150 may transmit the apps 141, 143 being executed through the execution manager module 147 and information on the execution states of the apps 141, 143 to the intelligent agent 145. The processor 150 may transmit the user speech to the intelligent server 200 through the intelligent agent 145. The processor 150 may receive parameter information of the speech of the user from the intelligent server 200 through the intelligent agent 145. The processor 150 may deliver the parameter information, received through the intelligent agent 145, to the execution manager module 147. The execution manager module 147 may change the parameters of the actions 141b, 143b into a new parameter using the received parameter information.

The processor 150 may transmit parameter information, included in a path rule, to the apps 141, 143 by executing the execution manager module 147. When the plurality of apps 141 and 143 is sequentially executed according to the path rule, the execution manager module 147 may transmit the parameter information, included in the path rule, from one app to another app.

The processor 150 may receive a plurality of path rules by executing the execution manager module 147. The processor 150 may select the plurality of path rules based on speech of a user through the execution manager module 147. For example, if speech of a user has specified some app 141 to execute some action 141*a* through the execution manager module 147, but has not specified another app 143 to execute the remaining action 143*b*, the processor 150 may receive a plurality of different path rules by which the same app 141 (e.g., a gallery app) to execute some action 141*a* is executed and different apps 143 (e.g., a message app, a telegram app) capable of executing the remaining action 143*b* are executed. The processor 150 may execute the same actions 141*b* and 143*b* (e.g., continuous identical actions 141*b* and 143*b*) of the plurality of path rules through the execution manager module 147, for example. When up to the same action is executed, the processor 150 may display a state screen in which the different apps 141 and 143 included in the plurality of path rules can be selected through the execution manager module 147 on the display 120.

The intelligent service module 149 may include a context module 149*a*, a persona module 149*b* or a suggestion module 149*c*.

The processor 150 may collect the current states of the apps 141, 143 from the apps 141, 143 by executing the context module 149*a*. For example, the processor 150 may receive context information indicative of the current states of the apps 141, 143 by executing the context module 149*a*, and collect the current states of the apps 141, 143 through the received context information.

The processor 150 may manage personal information of a user who uses the user terminal 100 by executing the persona module 149*b*. For example, the processor 150 may collect use information and execution results of the user terminal 100 by executing the persona module 149*b*, and manage personal information of a user using the collected use information and execution results of the user terminal 100.

The processor 150 may predict a user's intent by executing the suggestion module 149*c* and recommend a command to the user based on the user's intent. For example, the processor 150 may recommend a command to a user depending on the current state (e.g., a time, a place, a situation and an app) of the user by executing the suggestion module 149*c*.

Figure 3:
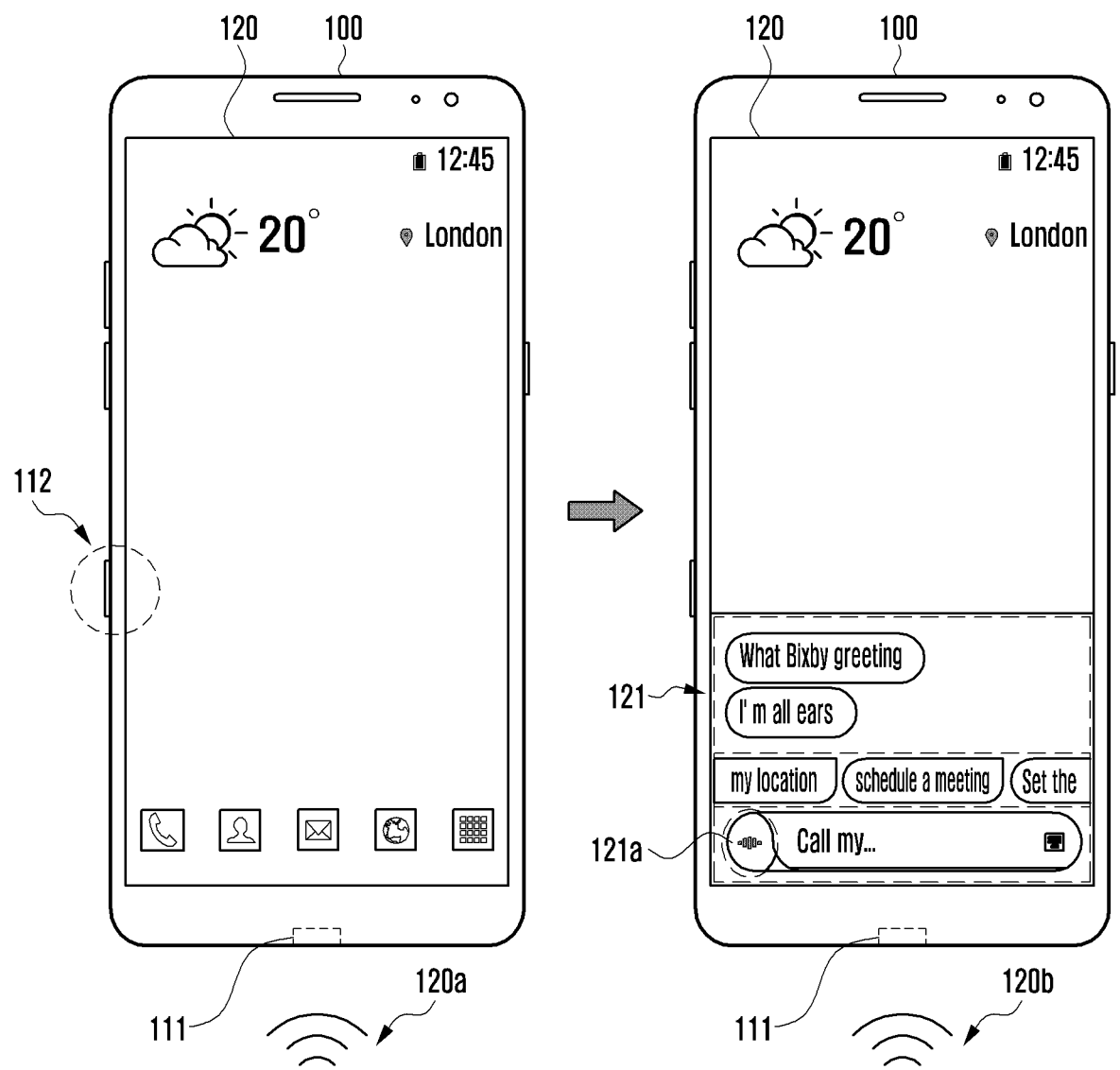
FIG. 3 is an illustration of an execution of an intelligent application program (app) of a user terminal according to an embodiment.

FIG. 3 is an illustration of an execution of an intelligent app of the user terminal 100 according to an embodiment.

Referring to FIG. 3, for example, the user terminal 100 receives a user input and executes an intelligent app (e.g., a voice recognition app) while operating in conjunction with the intelligent agent 145.

The user terminal 100 may execute an intelligent app for recognizing a voice through a hardware key 112. For example, when a user input is received through the hardware key 112, the user terminal 100 may display the user interface (UI) 121 of the intelligent app on the display 120. For example, in order to input a voice 120*b* in a state in which the UI 121 of the intelligent app has been displayed on the display 120, a voice recognition button 121*a* in the UI 121 of the intelligent app may be touched. For example, a user may input a voice 120*b* by continuously pressing the hardware key 112 in order to input the voice 120*b*.

The user terminal 100 may execute an intelligent app for recognizing a voice through a microphone 111. For example, when a designated voice 120*a* (e.g., "wake up!") is input through the microphone 111, the user terminal 100 may display the UI 121 of the intelligent app on the display 120.

Figure 4:
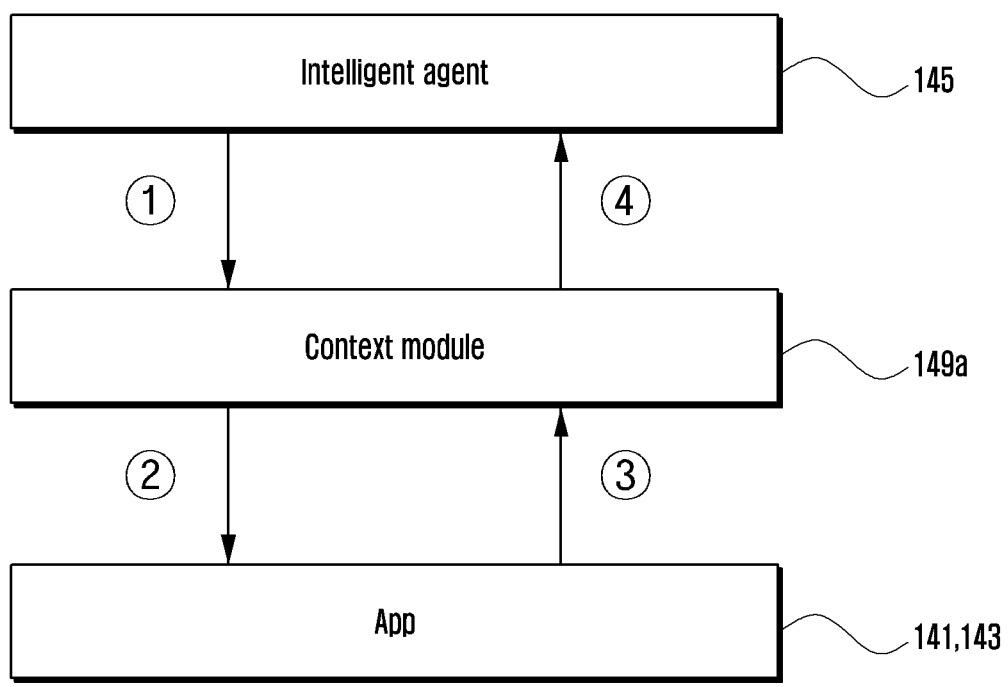
FIG. 4 is a block diagram illustrating that a context module of an intelligent service module collects a current state according to an embodiment.

FIG. 4 is an illustration of the context module 149*a* of the intelligent service module 149 collecting a current state according to an embodiment.

Referring to FIG. 4, when a context request is received ①  from the intelligent agent 145, the processor 150 may request ② context information indicative of the current states of the apps 141, 143 through the context module 149*a*. The processor 150 may receive ③ the context information from the apps 141, 143 through the context module 149*a*, and may transmit ④ the context information to the intelligent agent 145.

The processor 150 may receive a plurality of pieces of context information from the apps 141 and 143 through the context module 149*a*. The context information may be information on the apps 141 and 143 that have been executed most recently, for example. The context information may be information on a current state within the apps 141 and 143 (e.g., information on a corresponding picture while a user views a picture in a gallery), for example.

The processor 150 may receive context information indicative of the current state of the user terminal 100 from a device platform in addition to the apps 141 and 143 through the context module 149*a*. The context information may include general context information, user context information or device context information.

The general context information may include general information of the user terminal 100. The general context information may be checked through an internal algorithm after data is received through a sense hub of a device platform. For example, the general context information may include information on a current space and time. The information on the current space and time may include the current time or information on the current location of the user terminal 100, for example. The current time may be checked through the time on the user terminal 100. The information on the current location may be checked through a global positioning system (GPS). For example, the general context information may include information on a physical motion. The information on a physical motion may include information on walking, running or driving, for example. The information on a physical motion may be checked through a motion sensor. Through the information on driving, running may be checked through the motion sensor, and riding and parking may be checked by detecting a Bluetooth® connection within a vehicle. For example, the general context information may include user activity information. The user activity information may include information on commute, shopping, travel, etc., for example. The user activity information may be checked using information on the place where a user or app has been registered with a database.

The user context information may include information on a user. For example, the user context information may include information on the emotional state of a user. The information on the emotional state may include information on happiness, sadness or anger of a user, for example. For example, the user context information may include information on the current state of a user. The information on the current state may include information on an interest or intent (e.g., shopping), for example.

The device context information may include information on the state of the user terminal 100. For example, the device context information may include information on a path rule executed by the execution manager module 147. For example, the device information may include information on a battery. The information on a battery may be checked through the charging and discharging state of the battery, for example. For example, the device information may include information on a connected device and network. The information on a connected device may be checked through a communication interface to which the device is connected, for example.

Figure 5:
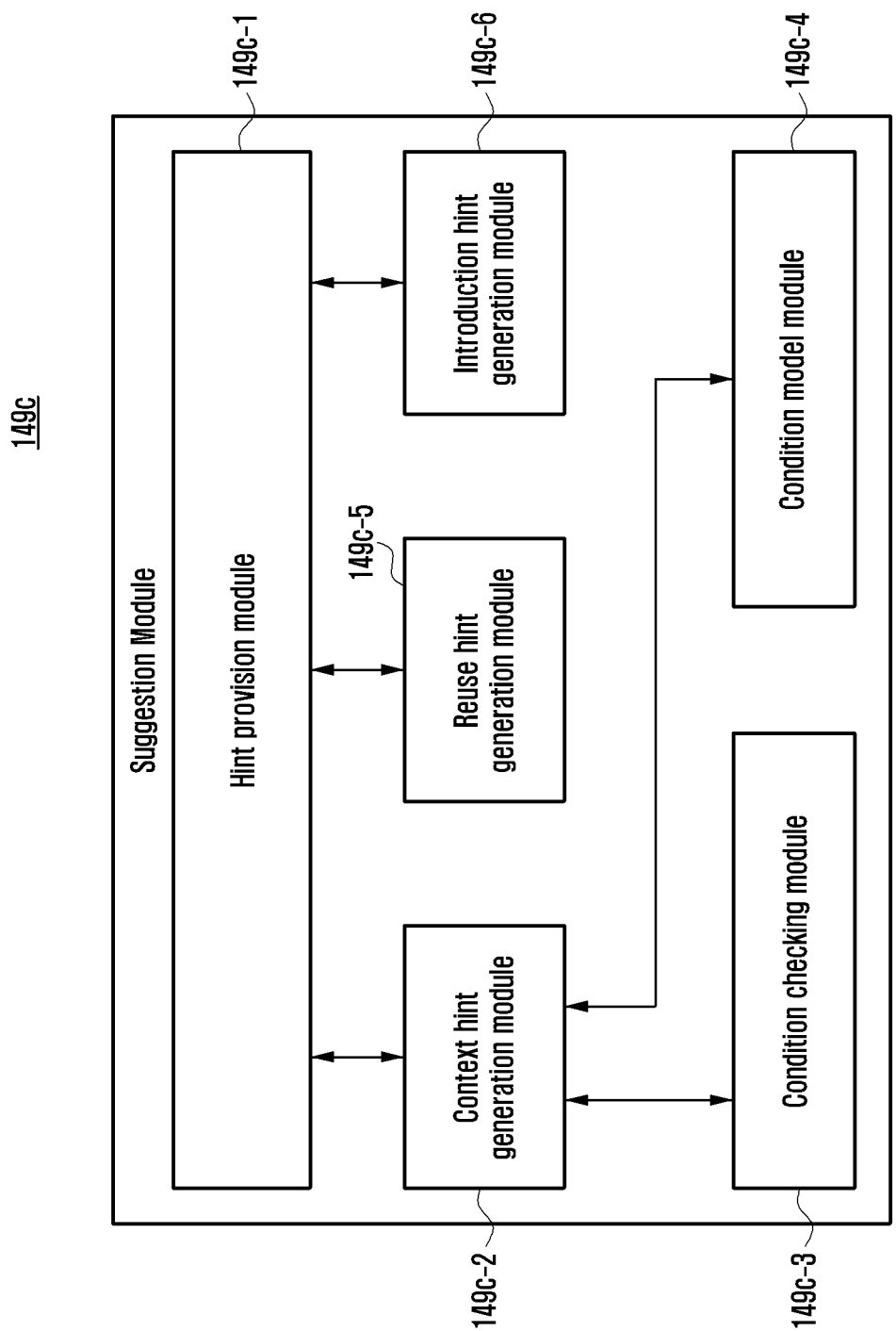
FIG. 5 is a block diagram of a suggestion module of an intelligent service module according to an embodiment.

FIG. 5 is a block diagram of the suggestion module 149c of the intelligent service module 149 according to an embodiment.

Referring to FIG. 5, the suggestion module 149c may include a hint provision module 149c-1, a context hint generation module 149c-2, a condition checking module 149c-3, a condition model module 149c-4, a reuse hint generation module 149c-5 or an introduction hint generation module 149c-6.

The processor 150 may provide a hint to a user by executing the hint provision module 149c-1. For example, the processor 150 may receive a hint, generated from the context hint generation module 149c-2, the reuse hint generation module 149c-5 or the introduction hint generation module 149c-6, through the hint provision module 149c-1, and may provide the hint to a user.

The processor 150 may generate a hint to be recommended depending on a current state by executing the condition checking module 149c-3 or the condition model module 149c-4. The processor 150 may receive information corresponding to the current state by executing the condition checking module 149c-3, and may set a condition model using the received information by executing the condition model module 149c-4. For example, the processor 150 may check the time, location, situation and an app being used when a hint is provided to a user by executing the condition model module 149c-4, and provide the user with hints having a good possibility that the hints will be used in corresponding conditions in order of highest priority.

The processor 150 may generate a hint to be recommended based on frequency of use by executing the reuse hint generation module 149c-5. For example, the processor 150 may generate a hint based on the use pattern of a user by executing the reuse hint generation module 149c-5.

The introduction hint generation module 149c-6 may generate a hint that introduces a user to a new function or a function used a lot by other users. For example, the hint that introduces the new function may include the introduction (e.g., operating method) of the intelligent agent 145.

The context hint generation module 149c-2, condition checking module 149c-3, condition model module 149c-4, reuse hint generation module 149c-5 or introduction hint generation module 149c-6 of the suggestion module 149c may be included in the personalization information server 300. For example, the processor 150 may receive a hint from the context hint generation module 149c-2, reuse hint generation module 149c-5 or introduction hint generation module 149c-6 of the user personalization information server 300 through the hint provision module 149c-1 of the suggestion module 149c, and may provide the received hint to a user.

The user terminal 100 may provide a hint according to a series of the following processes. For example, when a hint provision request is received from the intelligent agent 145, the processor 150 may transmit a hint generation request to the context hint generation module 149c-2 through the hint provision module 149c-1. When the hint generation request is received, the processor 150 may receive information, corresponding to a current state, from the context module 149a and the persona module 149b through the condition checking module 149c-3. The processor 150 may deliver the information, received through the condition checking module 149c-3, to the condition model module 149c-4, and may assign priority to hints provided to a user in order of a good possibility that the hints will be used in the condition based on the information through the condition model module 149c-4. The processor 150 may check the condition through the context hint generation module 149c-2, and may generate a hint corresponding to the current state. The processor 150 may transmit the generated hint to the hint provision module 149c-1 through the context hint generation module 149c-2. The processor 150 may arrange the hint according to a designated rule through the hint provision module 149c-1, and may transmit the hint to the intelligent agent 145.

The processor 150 may generate a plurality of context hints through the hint provision module 149c-1, and may designate a priority to the plurality of context hints according to a designated rule. The processor 150 may first provide a user with a context hint that belongs to the plurality of context hints and has a higher priority through the hint provision module 149c-1.

The user terminal 100 may suggest a hint according to frequency of use. For example, when a hint provision request is received from the intelligent agent 145, the processor 150 may transmit a hint generation request to the reuse hint generation module 149c-5 through the hint provision module 149c-1. When the hint generation request is received, the processor 150 may receive user information from the persona module 149b through the reuse hint generation module 149c-5. For example, the processor 150 may receive a path rule included in preference information of a user of the persona module 149b, a parameter included in the path rule, execution frequency of an app, and information on the space and time where the app is used through the reuse hint generation module 149c-5. The processor 150 may generate a hint corresponding to the received user information through the reuse hint generation module 149c-5. The processor 150 may transmit the generated hint to the hint provision module 149c-1 through the reuse hint generation module 149c-5. The processor 150 may arrange the hint through the hint provision module 149c-1 and transmit the hint to the intelligent agent 145.

The user terminal 100 may suggest a hint for a new function. For example, when a hint provision request is received from the intelligent agent 145, the processor 150 may transmit a hint generation request to the introduction hint generation module 149c-6 through the hint provision module 149c-1. The processor 150 may receive information on a function to be introduced from the suggestion server 400 by delivering the introduction hint provision request from the suggestion server 400 through the introduction hint generation module 149c-6. The suggestion server 400 may store information on a function to be introduced, for example. A hint list for the function to be introduced may be updated by a service operator. The processor 150 may transmit the generated hint to the hint provision module 149c-1 through the introduction hint generation module 149c-6. The processor 150 may arrange the hint through the hint provision module 149c-1 and transmit the hint to the intelligent agent 145.

Accordingly, the processor 150 may provide a user with a hint, generated from the context hint generation module 149c-2, the reuse hint generation module 149c-5 or the introduction hint generation module 149c-6, through the suggestion module 149c. For example, the processor 150 may display the generated hint in an app for driving the intelligent agent 145 through the suggestion module 149c, and may receive an input to select the hint from a user through the app.

Figure 6:
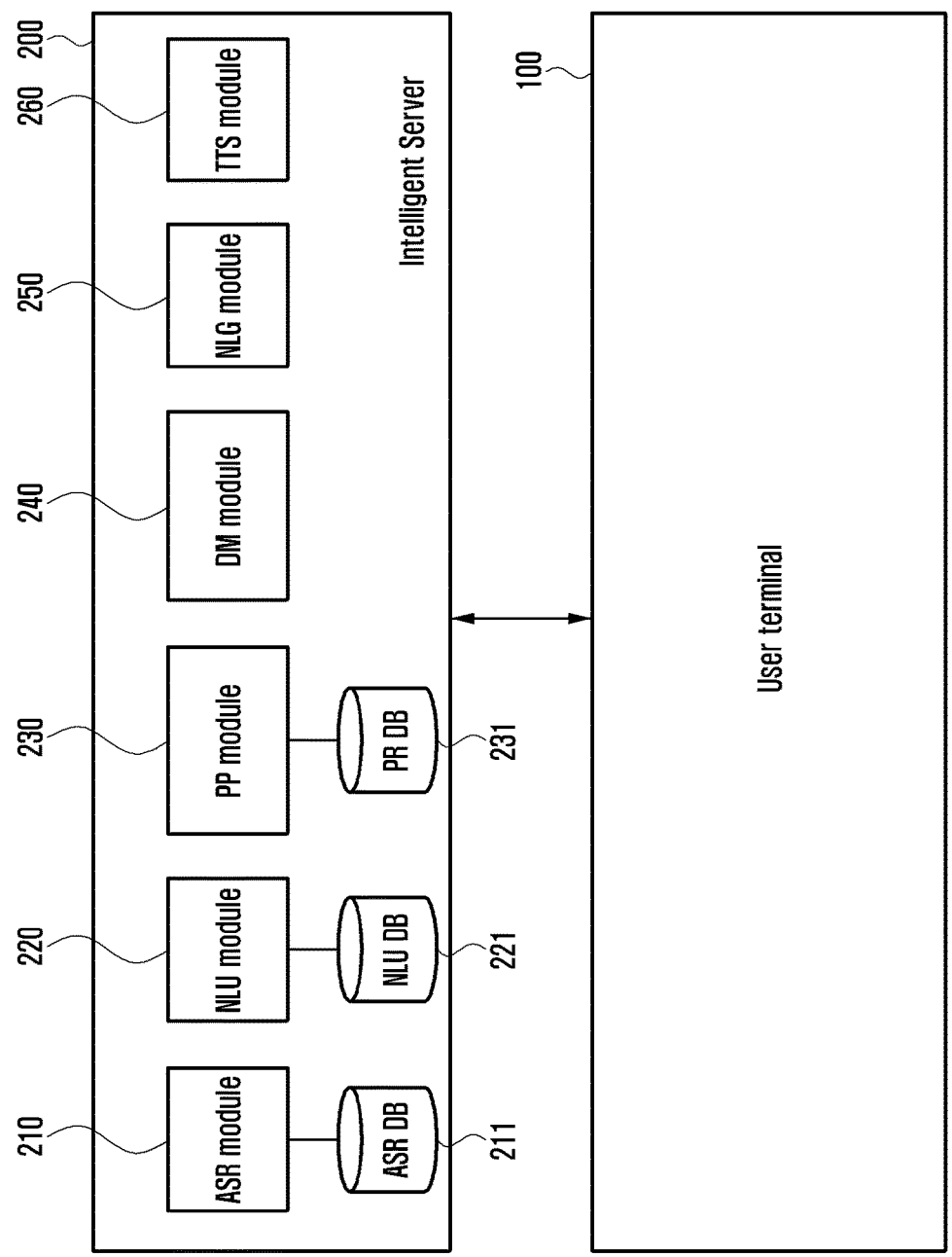
FIG. 6 is a block diagram of an intelligent server of an integrated intelligence system according to an embodiment.

FIG. 6 is a block diagram of the intelligent server 200 of the integrated intelligence system 10 according to an embodiment.

Referring to FIG. 6, the intelligent server 200 may include an automatic speech recognition (ASR) module 210, a natural language understanding (NLU) module 220, a path planner (PP) module 230, a dialogue manager (DM) module 240, a natural language generation (NLG) module 250 or a text to speech (TTS) module 260. The intelligent server 200 may include a communication circuit, memory and a processor. The processor may drive the ASR module 210, the NLU module 220, the PP module 230, the DM module 240, the NLG module 250 and the TTS module 260 by executing instructions stored in the memory. The intelligent server 200 may transmit and receive data (or information) to and from the user terminal 100 through the communication circuit.

The NLU module 220 or PP module 230 of the intelligent server 200 may generate a path rule.

The ASR module 210 may convert a user input, received from the user terminal 100, into text data.

The ASR module 210 may convert a user input, received from the user terminal 100, into text data. For example, the ASR module 210 may include a speech recognition module. The speech recognition module may include an acoustic model and a language model. For example, the acoustic model may include information related to speech. The language model may include unit phoneme information and information on a combination of the unit phoneme information. The speech recognition module may convert a user's speech into text data using information related to speech and information on unit phoneme information. The information on the acoustic model and the language model may be stored in an ASR database (ASR DB) 211, for example.

The NLU module 220 may confirm a user's intent by performing syntax analysis or semantic analysis. In the syntax analysis, a user input may be classified in a syntax unit (e.g., a word, a phrase or a morpheme), and the classified input may be identified to have a syntax element. The semantic analysis may be performed using semantic matching, rule matching or formula matching. Accordingly, the NLU module 220 may obtain a domain, an intent or a parameter (or slot) necessary to represent the intent from the user input.

The NLU module 220 may determine a user's intent and a parameter using a matching rule divided into a domain, an intent and a parameter (or slot) necessary to confirm the intent. For example, one domain (e.g., alarm) may include a plurality of intents (e.g., alarm setting and alarm release). A piece of intent may include a plurality of parameters (e.g., a time, a repetition number and an alarm sound). A plurality of rules may include one or more essential element parameters, for example. The matching rule may be stored in an NLU DB 221.

The NLU module 220 may confirm the meaning of a word extracted from a user input using a linguistic characteristic (e.g., a syntax element), such as a morpheme or a phrase, and may determine a user's intent by matching the identified meaning of the word with a domain and an intent. For example, the NLU module 220 may determine a user's intent by calculating how many words, extracted from a user input, have been included in each domain and intent.

The NLU module 220 may determine the parameter of a user input using a word that is a basis for confirming intent. The NLU module 220 may determine a user's intent using the NLU DB 221 in which a linguistic characteristic for confirming the intent of a user input has been stored. The NLU module 220 may determine a user's intent using a personalized language model (PLM). For example, the NLU module 220 may determine a user's intent using personalized information (e.g., a contact information list and a music list). The personalized language model may be stored in the NLU DB 221, for example. Not only the NLU module 220, but the ASR module 210 may recognize the voice of a user with reference to a personalized language model stored in the NLU DB 221.

The NLU module 220 may generate a path rule based on the intent of a user input and a parameter. For example, the NLU module 220 may select an app to be executed based on the intent of a user input and determine an action to be performed in the selected app. The NLU module 220 may determine a parameter corresponding to the determined action and generate a path rule. The path rule generated by the NLU module 220 may include an app to be executed, an action (e.g., at least one state) to be executed in the app, and a parameter necessary to execute the action.

The NLU module 220 may generate a single path rule or a plurality of path rules based on the intent of a user input and a parameter. For example, the NLU module 220 may receive a path rule set, corresponding to the user terminal 100, from the PP module 230, and may determine a path rule by mapping the intent of a user input and a parameter to the received path rule set.

The NLU module 220 may determine an app to be executed, an action to be executed in the app, a parameter necessary to execute the action based on the intent of a user input and a parameter, and generate a single path rule or a plurality of path rules. For example, the NLU module 220 may generate a path rule by arranging the app to be executed and the action to be executed in the app in an ontology or graph model form based on the intent of a user input using information of the user terminal 100. The generated path rule may be stored in a path rule database (PR DB) 231 through the PP module 230, for example. The generated path rule may be added to a path rule set of the PR DB 231.

The NLU module 220 may select at least one path rule of a plurality of generated path rules. For example, the NLU module 220 may select an optimal path rule of the plurality of path rules. For example, if only some action has been specified based on a user speech, the NLU module 220 may select a plurality of path rules. The NLU module 220 may determine one of the plurality of path rules based on an additional input from a user.

In accordance with one embodiment, the NLU module 220 may transmit a path rule to the user terminal 100 in response to a request for a user input. For example, the NLU module 220 may transmit one path rule, corresponding to a user input, to the user terminal 100. For example, the NLU module 220 may transmit a plurality of path rules, corresponding to a user input, to the user terminal 100. If only some action has been specified based on a user speech, for example, the plurality of path rules may be generated by the NLU module 220.

The PP module 230 may select at least one of a plurality of path rules.

The PP module 230 may transmit a path rule set, including a plurality of path rules, to the NLU module 220. The plurality of path rules of the path rule set may be stored in the PR DB 231, connected to the PP module 230, in a table form. For example, the PP module 230 may transmit a path rule set, corresponding to information (e.g., operating system (OS) information, app information, etc.) of the user terminal 100 received from the intelligent agent 145, to the NLU module 220. The table stored in the PR DB 231 may be stored by domain or by version of a domain, for example.

The PP module 230 may select one path rule or a plurality of path rules from a path rule set, and transmit the selected path rule or the plurality of rules to the NLU module 220. For example, the PP module 230 may select one path rule or a plurality of path rules by matching a user's intent and a parameter with a path rule set corresponding to the user terminal 100, and transmit the selected path rule or path rules to the NLU module 220.

The PP module 230 may generate one path rule or a plurality of path rules using a user's intent and a parameter. For example, the PP module 230 may generate one path rule or a plurality of path rules by determining an app to be executed and an action to be executed in the app based on a user's intent and a parameter. The PP module 230 may store the generated path rule or path rules in the PR DB 231.

The PP module 230 may store a path rule, generated by the NLU module 220, in the PR DB 231. The generated path rule may be added to a path rule set stored in the PR DB 231.

The table stored in the PR DB 231 may include a plurality of path rules or a plurality of path rule sets. The kind, version, type or characteristics of a device that performs each path rule may be incorporated into the plurality of path rules or the plurality of path rule sets.

The DM module 240 may determine whether a user's intent identified by the NLU module 220 is clear. For example, the DM module 240 may determine whether a user's intent is clear based on whether information of a parameter is sufficient. The DM module 240 may determine whether a parameter identified by the NLU module 220 is sufficient to perform a task. If a user's intent is not clear, the DM module 240 may perform feedback to request required information from a user. For example, the DM module 240 may perform feedback to request information on a parameter for confirming a user's intent.

The DM module 240 may include a content provider module. If an action is performed based on intent and a parameter identified by the NLU module 220, the content provider module may generate the results of the execution of a task corresponding to a user input. The DM module 240 may transmit results, generated by the content provider module, to the user terminal 100 as a response to a user input.

The NLG module 250 may change designated information into text form. The information changed into text form may be a form of natural language speech. The designated information may be information on an additional input, information providing guidance of the completion of an action corresponding to a user input, or information providing guidance of an additional input from a user (e.g., feedback information for a user input), for example. The information changed into text form may be transmitted to the user terminal 100 and displayed on the display 120 or may be transmitted to the TTS module 260 and changed into voice form.

The TTS module 260 may change information of a text form into information of a voice form. The TTS module 260 may receive information of a text form from the NLG module 250, change the information of a text form into information of a voice form, and transmit the information of a voice form to the user terminal 100. The user terminal 100 may output the information of a voice form to the speaker 130.

The NLU module 220, the PP module 230 and the DM module 240 may be implemented as a single module. For example, the NLU module 220, the PP module 230 and the DM module 240 may be implemented as a single module, and may determine a user's intent and a parameter and generate a response (e.g., path rule) corresponding to the determined user's intent and parameter. Accordingly, the generated response may be transmitted to the user terminal 100.

Figure 7:
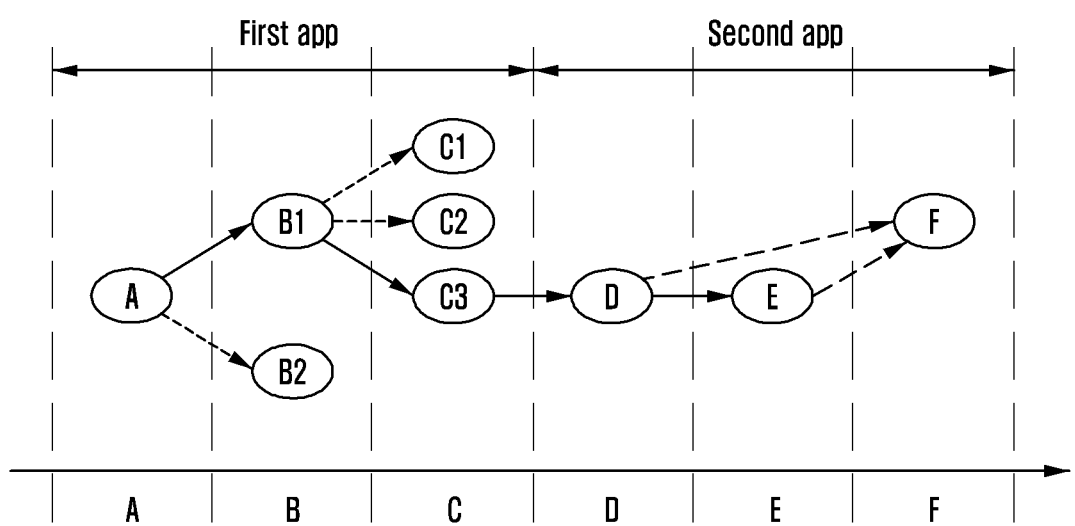
FIG. 7 is an illustration of a method of generating a path rule of a path planner module according to an embodiment.

FIG. 7 is an illustration of a method of generating a path rule of the PP module 230 according to an embodiment.

Referring to FIG. 7, the NLU module 220 may identify the function of an app to be any one action (e.g., state A to state F) and store it in the PR DB 231. For example, the NLU module 220 may store a path rule set, including a plurality of path rules (e.g., A-B1-C1, A-B1-C2, A-B1-C3-D-F, A-B1-C3-D-E-F, and A-B2) identified as any one action (e.g., a state), in the PR DB 231.

The PR DB 231 of the PP module 230 may store a path rule set for performing the function of an app. The path rule set may include a plurality of path rules including a plurality of actions (e.g., the sequence of states). Actions executed based on parameters input to a plurality of actions, respectively, may be sequentially arranged in the plurality of path rules. The plurality of path rules may be configured in an ontology or graph model form and stored in the PR DB 231.

The NLU module 220 may select an optimal path rule (e.g., A-B1-C3-D-F) of the plurality of path rules (e.g., A-B1-C1, A-B1-C2, A-B1-C3-D-F, A-B1-C3-D-E-F, and A-B2) corresponding to the intent of a user input and a parameter.

When there is no path rule perfectly matched with a user input, the NLU module 220 may transmit a plurality of rules to the user terminal 100. For example, the NLU module 220 may select a path rule (e.g., A-B1) partially corresponding to a user input. The NLU module 220 may select one or more path rules (e.g., A-B1-C1, A-B1-C2, A-B1-C3-D-F, A-B1-C3-D-E-F, and A-B2) including a path rule (e.g., A-B1) partially corresponding to a user input, and may transmit path rules to the user terminal 100.

The NLU module 220 may select one of a plurality of path rules based on the additional input of the user terminal 100, and may transmit the selected path rule to the user terminal 100. For example, the NLU module 220 may select one (e.g., A-B1-C3-D-F) of a plurality of path rules (e.g., A-B1-C1, A-B1-C2, A-B1-C3-D-F, A-B1-C3-D-E-F, and A-B2) in response to a user input (e.g., an input to select C3) additionally input by the user terminal 100, and transmit the one path rule to the user terminal 100.

The NLU module 220 may determine a user's intent and a parameter corresponding to a user input (e.g., an input to select C3) additionally input to the user terminal 100 through the NLU module 220, and transmit the determined user's intent or parameter to the user terminal 100. The user terminal 100 may select one (e.g., A-B1-C3-D-F) of a plurality of path rules (e.g., A-B1-C1, A-B1-C2, A-B1-C3-D-F, A-B1-C3-D-E-F, and A-B2) based on the transmitted intent or parameter.

Accordingly, the user terminal 100 may complete the action of the apps 141 and 143 based on the selected path rule.

When a user input including insufficient information is received by the intelligent server 200, the NLU module 220 may generate a path rule partially corresponding to the received user input. For example, the NLU module 220 may transmit the partially corresponding path rule to the intelligent agent 145. The processor 150 may receive the path rule by executing the intelligent agent 145 and deliver the partially corresponding path rule to the execution manager module 147. The processor 150 may execute the first app 141 according to the path rule through the execution manager module 147. The processor 150 may transmit information on an insufficient parameter to the intelligent agent 145 while executing the first app 141 through the execution manager module 147. The processor 150 may request an additional input from a user using the information on the insufficient parameter through the intelligent agent 145. When the additional input is received by the user through the intelligent agent 145, the processor 150 may process the user input by transmitting the additional input to the intelligent server 200. The NLU module 220 may generate an added path rule based on the intent of the additionally input user input and parameter information, and transmit the added path rule to the intelligent agent 145. The processor 150 may execute the second app 143 by transmitting the path rule to the execution manager module 147 through the intelligent agent 145.

When a user input having some information omitted is received by the intelligent server 200, the NLU module 220 may transmit a user information request to the personalization information server 300. The personalization information server 300 may transmit information of a user who has input the user input, stored in the persona or database, to the NLU module 220. The NLU module 220 may select a path rule corresponding to the user input having some action omitted using the user information. Accordingly, although a user input having some information omitted is received by the intelligent server 200, the NLU module 220 may determine a path rule corresponding to the user input by receiving an additional input by requesting the omitted information or using user information.

Table 1 below shows an exemplary form of a path rule related to a task requested by a user according to an embodiment.

TABLE 1

| Path rule ID | State | parameter |
| --- | --- | --- |
| Gallery_101 | pictureView (25) | NULL |
| | searchView (26) | NULL |
| | searchViewResult (27) | Location, time |
| | SearchEmptySelectedView (28) | NULL |
| | SearchSelectedView (29) | ContentType, selectall |
| | CrossShare (30) | anaphora |

Referring to Table 1 above, a path rule generated or selected by the intelligent server 200 of FIG. 1 in response to a user speech (e.g., "Let the picture be shared") may include at least one of the states 25, 26, 27, 28, 29 or 30. For example, the at least one state (e.g., any one action state of a terminal) may correspond to at least one of picture app execution (pictureView (25)), picture search function execution (searchView (26)), search result display screen output (searchViewResult (27)), search result display screen output not including selected picture (SearchEmptySelectedView (28)), search result display screen output including at least one selected picture (SearchSelectedView (29)) or shared app selection screen output (CrossShare (30)).

Parameter information of the path rule may correspond to at least one state. For example, the parameter information may be included in the SearchSelectedView (29).

As the results of the execution of the path rule including the sequence of the states 25, 26, 27, 28 and 29, a task (e.g., "Let a picture be shared!") requested by a user may be performed.

Figure 8:
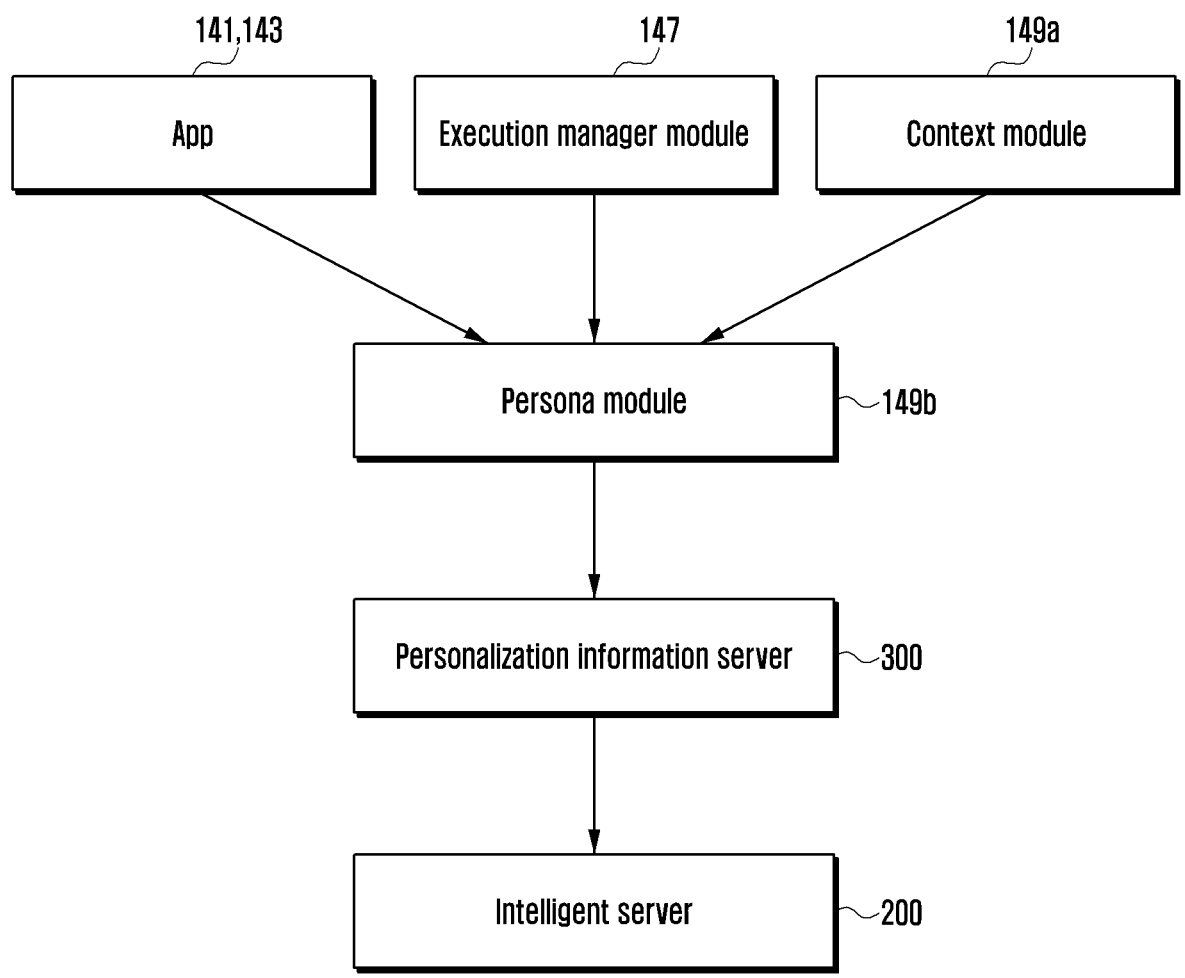
FIG. 8 is a block diagram illustrating that a persona module of an intelligent service module manages information on a user according to an embodiment.

FIG. 8 is an illustration of the persona module 149b of the intelligent service module managing information of a user according to an embodiment.

Referring to FIG. 8, the processor 150 may receive information of the user terminal 100 from the apps 141, 143, the execution manager module 147 or the context module 149a through the persona module 149b. The processor 150 may store result information that is the results of the execution of the action of an app in an action log database through the apps 141, 143 and the execution manager module 147. The processor 150 may store information on the current state of the user terminal 100 in a context database through the context module 149a. The processor 150 may receive the stored information from the action log database or the context database through the persona module 149b. The data stored in the action log database and the context database may be analyzed by an analysis engine, for example, and delivered to the persona module 149b.

The processor 150 may transmit information, received from the apps 141, 143, the execution manager module 147 or the context module 149a, to the suggestion module 149c through the persona module 149b. For example, the processor 150 may transmit data, stored in the action log database or the context database, to the suggestion module 149c through the persona module 149b.

The processor 150 may transmit information, received from the apps 141, 143, the execution manager module 147 or the context module 149a, to the personalization information server 300 through the persona module 149b. For example, the processor 150 may periodically transmit data, accumulated and stored in the action log database or the context database, to the personalization information server 300 through the persona module 149b.

The processor 150 may transmit data, stored in the action log database or the context database, to the suggestion module 149c through the persona module 149b. User information generated through the persona module 149b may be stored in a persona or database. The persona module 149b may periodically transmit user information, stored in the persona or database, to the personalization information server 300. Information transmitted to the personalization information server 300 through the persona module 149b may be stored in the persona or database. The personalization information server 300 may infer user information necessary to generate a path rule of the intelligent server 200 using information stored in the persona or database.

User information inferred using information transmitted through the persona module 149b may include profile information or preference information. The profile information or preference information may be inferred through the account of a user and accumulated information.

The profile information may include personal information of a user. For example, the profile information may include demographics information of a user. The demographics information may include the gender and age of a user, for example. For example, the profile information may include life event information. The life event information may be inferred by comparing log information with a life event model, for example, and be reinforced by analyzing a behavior pattern. For example, the profile information may include interest information. The interest information may include interested shopping articles and an interest field (e.g., sports, politics), for example. For example, the profile information may include activity area information. The activity area information may include information on a house or a workplace, for example. The information on the activity area may include information on the area in which priority has been written based on an accumulated transit time and visit number in addition to information on the location of a place. For example, the profile information may include activity time information. The activity time information may include information on the hour of rising, a commute time and a sleep time, for example. The information on the commute time may be inferred using the activity area information (e.g., information on a house and workplace). The information on the sleep time may be inferred through the unused time of the user terminal 100.

The preference information may include preference level information of a user. For example, the preference information may include information on an app preference level. The app preference level may be inferred through the use record (e.g., use record by time and place) of an app, for example. The preference level of an app may be used to determine an app to be executed depending on the current state (e.g., a time, a place) of a user. For example, the preference information may include information on a contact information preference level. The contact information preference level may be inferred by analyzing contact frequency (e.g., communication frequency by time and place) information of contact information, for example. The contact information preference level may be used to determine contact information depending on the current state (e.g., communication for a redundant name) of a user. For example, the preference information may include setting information. The setting information may be inferred by analyzing setting frequency (e.g., frequency set as a setting value by time and place) information of a given setting value, for example. The setting information may be used to set a given setting value depending on the current state (e.g., a time, a place, a situation) of a user. For example, the preference information may include a place preference level. The place preference level may be inferred through the visit history (e.g., a visit record by time) of a given place, for example. The place preference level may be used to determine a visiting place depending on the current state (e.g., a time) of a user. For example, the preference information may include a command preference level. The command preference level may be inferred through command use frequency (e.g., a use frequency by time and place), for example. The command preference level may be used to determine a command pattern to be used depending on the current state (e.g., a time, a place) of a user. For example, the command preference level may include information on a menu most selected by a user in the current state of an app that is being executed by analyzing log information.

Figure 9:
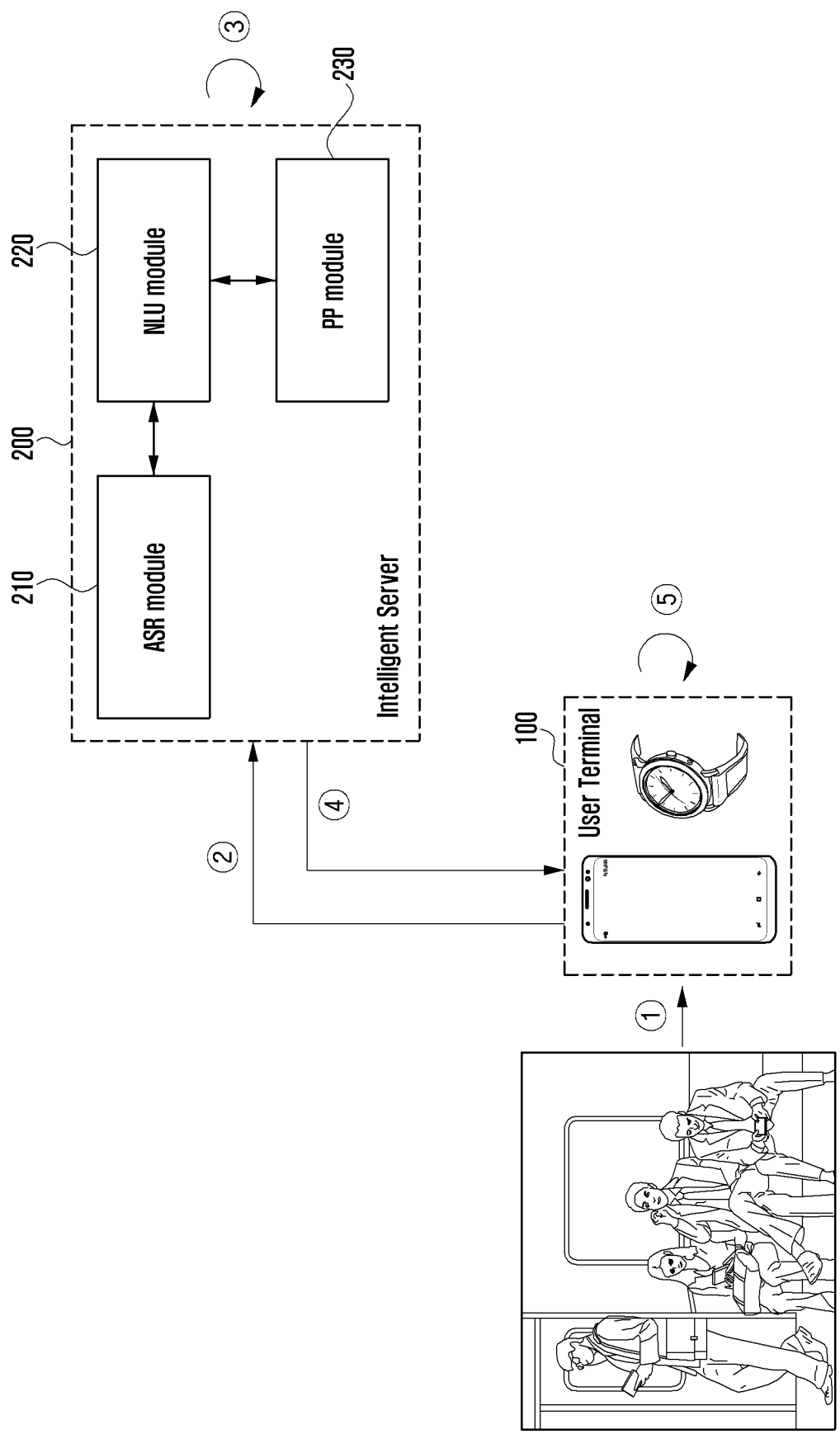
FIG. 9 is a block diagram illustrating a situation in which a function is executed using a voice and an environmental sound input to a user terminal in an integrated intelligence system according to an embodiment.

FIG. 9 is a block diagram illustrating a situation in which a function is executed using a voice and an environmental sound input to the user terminal 100 in the integrated intelligence system 10 according to an embodiment.

Referring to FIG. 9, at step ①, the user terminal 100 may receive a command of a user to request music playback. For example, the user terminal 100 may receive the voice of the user to request music playback using an input module (e.g., the input module 110 of FIG. 1). At this time, the user terminal 100 may also receive an environmental sound (e.g., noise, a surrounding sound) occurring from the place where the user is located along with the voice of the user. That is, the user terminal 100 may receive audio data (or sound data) including the voice and the environmental sound.

For example, the user terminal 100 may receive a voice of a user who says "Play back music" while taking a subway train. In this case, the user may have checked guidance for the use of the subway by requesting a path to a destination using the user terminal 100. Furthermore, the user terminal 100 may also receive an environmental sound providing guidance of the name of a next station "Next station is Sadang" broadcasted within the subway.

The user terminal 100 may recognize the contents of audio data and perform a corresponding function using the intelligent agent 145 of FIG. 2 stored therein. In FIG. 9, the user terminal 100 performs a function while operating in conjunction with the intelligent server 200.

At step ②, the user terminal 100 may transmit the received voice and environmental sound to the intelligent server 200 over the communication network 500.

At step ③, the intelligent server 200 may generate a path rule using the received voice and the environmental sound.

The ASR module 210 of the intelligent server 200 may obtain a voice signal and an environmental sound signal from the received audio data. The ASR module 210 may convert the voice signal and the environmental sound signal in the form of text data. For example, the speech recognition module of the ASR module 210 may convert the received voice signal and the environmental sound signal in the form of text data using speech and phoneme information included in the voice signal and the environmental sound signal and information on a combination of phoneme information.

If an environmental sound signal is not a voice, the ASR module 210 may perform an operation of determining the pattern of the environmental sound signal.

The NLU module 220 of the intelligent server 200 may confirm the contents of the voice by performing syntax analysis or semantic analysis on the voice signal "Play back music" converted into the text data. For example, the NLU module 220 may obtain the domain (e.g., music) and the intent (e.g., music playback) of the received voice and a parameter (e.g., a music file, a radio channel) necessary to express the intent.

The NLU module 220 may generate one path rule or a plurality of path rules based on the intent of a user input and a parameter. For example, the NLU module 220 may select a music playback app and generate a path rule to determine a music file to be played back. The NLU module 220 may select a radio playback app and generate a path rule to determine a channel to be played back.

The PP module 230 may select at least one of the plurality of path rules.

The PP module 230 may select a path rule corresponding to information (e.g., app information) of the user terminal 100 received from the intelligent agent 145 of FIG. 2 of the user terminal 100, and may transmit the selected path rule to the NLU module 220. For example, the PP module 230 may receive information regarding that a user uses a music playback app more frequently than a radio app, and select a path rule to execute the music playback app. The PP module 230 may transmit the selected path rule to the NLU module 220.

The intelligent server 200 may change an action included in the path rule based on the size of a voice to request music playback. For example, when the volume of the received voice of a user is small compared to an accumulated situation, the intelligent server 200 may change an action included in a path rule so that a volume when music is played back is set less than a step normally set by the user.

The NLU module 220 of the intelligent server 200 may confirm the contents of the voice by performing syntax analysis or semantic analysis on the environmental sound signal "Next station is Sadang" converted into the text data.

The NLU module 220 may generate one path rule or a plurality of path rules based on a user's intent and an analyzed environmental sound signal. For example, the NLU module 220 may confirm the meaning of an environmental sound signal providing guidance of the name of a next station, confirm the situation in which the user terminal 100 has informed the user of a path up to a destination, and generate a path rule that provides guidance of the remaining subway stations to the destination.

The NLU module 220 may execute a subway line map app and generate a path rule indicating the remaining subway stations in the moving path of a user. The NLU module 220 may execute the speaker and generate a path rule that provides guidance of the number of remaining subway stations in a voice form.

The PP module 230 may select at least one of the plurality of path rules.

The PP module 230 may select a path rule corresponding to information (e.g., app information) of the user terminal 100 received from the intelligent agent 145 of FIG. 2 of the user terminal 100, and may transmit the selected path rule to the NLU module 220. For example, the PP module 230 may confirm that the user terminal 100 will execute a music playback app, execute the speaker, and select a path rule that provides guidance of the number of remaining subway stations in a voice form.

At step ④, the intelligent server 200 may transmit the selected path rule to the user terminal 100.

At step ⑤, the user terminal 100 may execute a music playback app according to the received path rule and play back a selected music file. Furthermore, the user terminal 100 may calculate the number of remaining stations based on a destination and the location of a current station, and inform the user of the number of remaining stations through the speaker.

As described above, the integrated intelligent system 10 according to an embodiment of the present disclosure may generate an additional path rule using environmental information (e.g., the situation in which a user moves while riding a subway train) generated using an environmental sound (e.g., a subway guidance comment) when generating a path rule according to the command of a user.

FIG. 10A is a block diagram illustrating a situation in which a function is executed using a voice and an environmental sound input to the user terminal 100 in the integrated intelligence system 10 according to an embodiment.

Referring to FIG. 10A, at step ①, the user terminal 100 may receive a command of a user to request music playback. For example, the user terminal 100 may receive a voice of the user to request music playback using the input module 110 of FIG. 1. At this time, the user terminal 100 may also receive an environmental sound (e.g., noise, a surrounding sound) occurring from the place where the user is located along with the voice of the user. That is, the user terminal 100 may receive audio data including the voice and the environmental sound.

For example, the user terminal 100 may receive a voice of a user who says "Play back music" in the place where it rains. Furthermore, the user terminal 100 may receive a raining sound as an environmental sound for the situation where the user is located.

At step ②, the user terminal 100 may transmit the received voice and environmental sound to the intelligent server 200 over the communication network 500.

At step ③, the intelligent server 200 may generate a path rule using the received voice and environmental sound.

The ASR module 210 of the intelligent server 200 may obtain a voice signal and environmental sound signal from the received audio data. The ASR module 210 may convert the voice signal and environmental sound signal in the form of text data. The ASR module 210 may convert the voice signal from which the environmental sound signal has been separated in the form of text data. For example, the speech recognition module of the ASR module 210 may convert the received voice signal in the form of text data using speech and phoneme information included in the received voice signal and information on a combination of the phoneme information.

The NLU module 220 of the intelligent server 200 may confirm the contents of the voice by performing syntax analysis or semantic analysis on the voice signal "Play back music" converted into the text data. For example, the NLU module 220 may obtain the domain (e.g., music) and the intent (e.g., music playback) of the received voice or a parameter (e.g., music files, a radio channel) necessary to express the intent.

The NLU module 220 may generate one path rule or a plurality of path rules based on the intent of the user input and the parameter. For example, the NLU module 220 may select a music playback app and generate a path rule that determines a music file to be played back. In accordance with an embodiment, the NLU module 220 may select a radio playback app and generate a path rule that determines a channel to be played back.

The PP module 230 may select at least one of the plurality of path rules.

The PP module 230 may select a path rule corresponding to information (e.g., app information) of the user terminal 100 received from the intelligent agent 145 of FIG. 2 of the user terminal 100, and may transmit the selected path rule to the NLU module 220. For example, the PP module 230 may receive information on the situation in which the user has recently played back a radio app, and may select a path rule that executes the radio app. The PP module 230 may transmit the selected path rule to the NLU module 220.

The intelligent server 200 may change an action included in a path rule based on a voice tone of a user who requests music playback. For example, the intelligent server 200 may analyze received voice and change an action included in a path rule so that a music file to be played back is differently set depending on a mood (e.g., a depressed state, a pleasant state or a sad state) of a user.

The NLU module 220 of the intelligent server 200 may determine (or analyze or confirm) the pattern of an environmental sound signal. For example, the NLU module 220 may confirm that it is raining in the area where a user is located by analyzing the pattern of an environmental sound signal.

Additionally, the NLU module 220 may use information of the user terminal 100 received from the intelligent agent 145 of FIG. 2 of the user terminal 100. For example, the NLU module 220 can increase accuracy regarding that it is raining in the area where a user is located using location information and weather information received from the user terminal 100.

The NLU module 220 may generate one path rule or a plurality of path rules based on the analyzed pattern of the environmental sound signal. For example, the NLU module 220 may generate a path rule that provides guidance of the preparation of an umbrella.

The NLU module 220 may execute a weather app and display a UI that provides guidance of the preparation of an umbrella. The NLU module 220 may execute the speaker and generate a path rule that provides guidance of an umbrella in a voice form.

The PP module 230 may select at least one of the plurality of path rules.

The PP module 230 may select a path rule corresponding to information (e.g., app information) of the user terminal 100 received from the intelligent agent 145 of FIG. 2 of the user terminal 100, and may transmit the selected path rule to the NLU module 220. For example, the PP module 230 may confirm that the user terminal 100 will execute a music playback app, execute the speaker, and select a path rule that provides guidance of the preparation of an umbrella in a voice form.

At step ④, the intelligent server 200 may transmit a selected path rule to the user terminal 100.

At step ⑤, the user terminal 100 may execute a music playback app according to the received path rule and play back a selected music file. Furthermore, the user terminal 100 may provide guidance of the preparation of an umbrella in a voice form.

The intelligent server 200 may perform recognition for a voice signal and environmental sound signal using the above-described ASR module 210, and NLU module 220 as described above, but the present disclosure is not limited thereto. The intelligent server 200 may include the ASR module 210 and the NLU module 220 for a voice signal and an environmental sound signal, respectively.

As described above, the integrated intelligent system 10 according to an embodiment may generate an additional path rule using an environmental (e.g., the situation in which it rains) generated using the pattern of an environmental sound signal when it generates a path rule according to a command of a user.

Figure 10B:
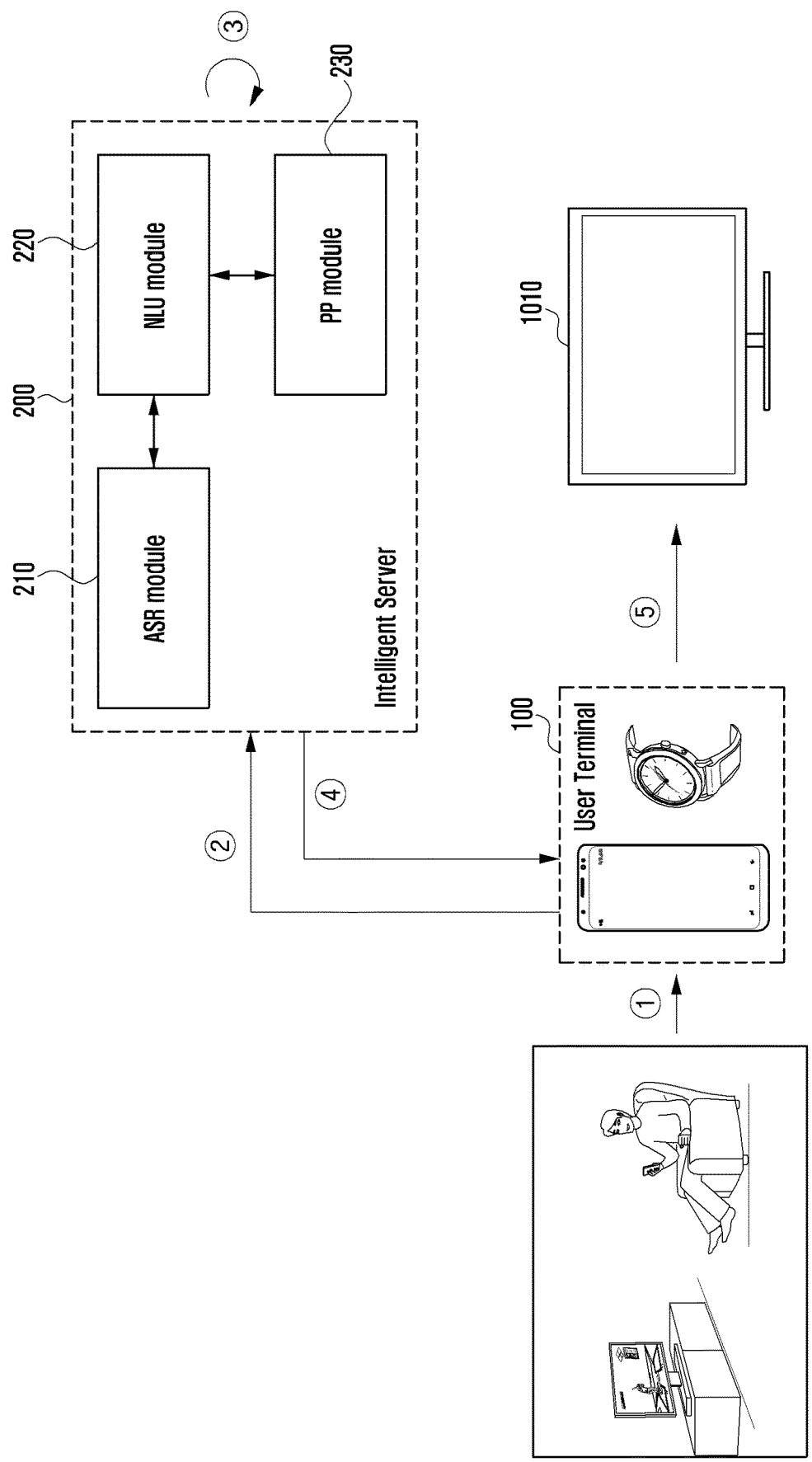
FIG. 10B is a block diagram illustrating a situation in which a device is controlled using a voice and an environmental sound input to a user terminal in an integrated intelligence system according to an embodiment.

FIG. 10B is a block diagram illustrating a situation in which a device is controlled using a voice and environmental sound input to the user terminal 100 in the integrated intelligence system 10 according to an embodiment.

Referring to FIG. 10B, at step ①, the user terminal 100 may receive a command of a user who requests to turn down a sound. For example, the user terminal 100 may receive a voice of a user who requests to turn down a sound using the input module 110 of FIG. 1. At this time, the user terminal 100 may also receive an environmental sound (e.g., a TV sound or a home speaker sound) occurring from the place where the user is located along with the voice of the user. That is, the user terminal 100 may receive audio data including the voice and the environmental sound.

For example, the user terminal 100 may receive a voice of a user who says "Turn down sound" in the place where the user watches TV.

At step ②, the user terminal 100 may transmit the received voice and environmental sound to the intelligent server 200 over the communication network 500.

At step ③, the intelligent server 200 may generate a path rule using the received voice and environmental sound.

The ASR module 210 of the intelligent server 200 may obtain a voice signal and environmental sound signal from the received audio data. The ASR module 210 may convert the voice signal and the environmental sound signal in the form of text data. The ASR module 210 may convert the voice signal from which the environmental sound signal has been separated in the form of text data. For example, the speech recognition module of the ASR module 210 may convert the received voice signal in the form of text data using speech and phoneme information included in the received voice signal and information on a combination of the phoneme information.

The NLU module 220 of the intelligent server 200 may confirm the contents of the voice by performing syntax analysis or semantic analysis on the voice signal "Turn down sound" converted into the text data.

The NLU module 220 of the intelligent server 200 may determine (or analyze, confirm or identify) the pattern of the environmental sound signal. For example, the NLU module 220 may confirm that the user is located in the place where the user watches TV by analyzing the pattern of the environmental sound signal.

The NLU module 220 may generate one path rule or a plurality of path rules using the contents of the voice signal and the pattern of the environmental sound signal. For example, the NLU module 220 may include a deep NLU module for estimating a user's intent by combining the contents of a voice signal and the pattern of an environmental sound signal.

The deep NLU module may identify that there is no object whose sound is to be reduced based on a result of the analysis of the contents of the voice signal, and may estimate that the user's intent is to turn down the sound of TV 1010 by analyzing the pattern of the environmental sound signal.

Furthermore, the deep NLU module may generate a path rule that transmits a signal to turn down the sound to TV 1010 with which communication with the user terminal 100 has already been established.

The PP module 230 may select at least one of the plurality of path rules.

For example, the PP module 230 may select a path rule that transmits a signal requesting to turn down a sound toward the TV 1010 with which communication with the user terminal 100 has been established.

At step ④, the intelligent server 200 may transmit the selected path rule to the user terminal 100.

At step ⑤, the user terminal 100 may generate a signal to control the volume of the TV 1010 according to the received path rule, and may transmit the signal.

The intelligent server 200 may perform recognition for a voice signal and environmental sound signal using the above-described one ASR module 210, NLU module 220 as described above, but the present disclosure is not limited thereto. The intelligent server 200 may include the ASR module 210 and the NLU module 220 for a voice signal and an environmental sound signal, respectively.

As described above, the integrated intelligent system 10 according to an embodiment of the present disclosure may generate a path rule into which a user's intent has been incorporated by combining a command of the user and the pattern of an environmental sound signal. Furthermore, the integrated intelligent system 10 according to an embodiment of the present disclosure may control the TV 1010 using the user terminal 100.

Figure 11:
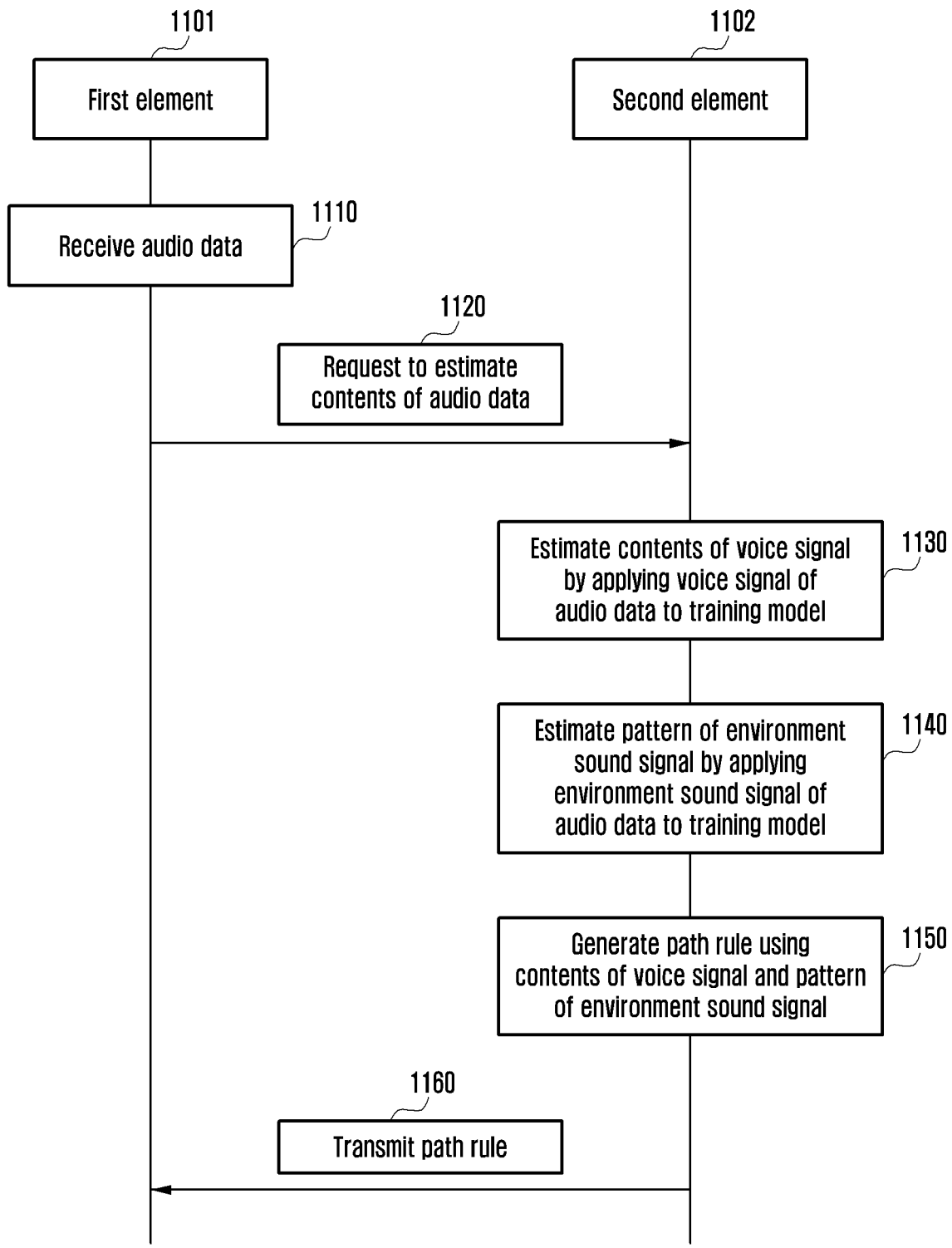
FIG. 11 is a flowchart of a method of generating a path rule using a voice and an environmental sound input to a user terminal in an integrated intelligence system according to an embodiment.

FIG. 11 is a flowchart of a method of generating a path rule using a voice and environmental sound input to a user terminal in the integrated intelligence system 10 according to an embodiment.

Referring to FIG. 11, a first element 1101 may be the user terminal 100, for example, and a second element 1102 may be the intelligent server 200 of FIG. 1, for example. Alternatively, the first element 1101 may be a general-purpose processor, for example, and the second element 1102 may be an artificial intelligent-dedicated processor, for example. Alternatively, the first element 1101 may be at least one app, for example, and the second element 1102 may be an OS, for example.

The second element 1102 is an element more integrated or dedicated than the first element 1101 or configured to have less delay, greater performance or more resources than the first element 1101. The second element 1102 may be an element capable of rapidly processing numerous operations necessary when a training model for recognizing audio data including a voice signal and an environmental sound signal is generated, updated or applied as compared to the first element 1101. Accordingly, the first element 1101 may also process the generation, update or application of the training model.

The training model may be fabricated in the form of at least one hardware integrated circuit or chip and mounted on an electronic device. For example, the training model may be fabricated in the form of a dedicated hardware chip for AI or may be fabricated as part of the existing general-purpose processor (e.g., central processing unit (CPU) or an application processor (AP)) or a graphic-dedicated processor (e.g., a graphics processing unit (GPU)) and mounted on the above-described various electronic devices.

In accordance with an embodiment, the training model may substitute for at least one of the ASR module 210, the NLU module 220, the PP module 230, the DM module 240, the NLG module 250 or the TTS module 260 of FIG. 6, for example. For example, the role of at least one of the above-described modules may be performed by the training model. The training model may include a plurality of sub-training models and perform the roles of the above-described modules or may include a single training model and perform all the roles of the above-described modules.

The training model may substitute for at least one of the intelligent agent 145, the intelligent service module 149 or the execution manager module 147 of FIG. 2, for example. For example, the role of at least one of the above-described modules may be performed by the training model. The training model may include a plurality of sub-training model and perform the roles of the above-described modules or may include a single training model and perform all the roles of the above-described modules.

A third element performing a function similar to that of the second element 1102 may be added. For example, the second element 1102 may be an element configured to perform an operation necessary when a training model configured to recognize the voice signal of audio data is generated, updated or applied. Furthermore, the third element may be an element configured to perform an operation necessary when a training model configured to recognize an environmental sound signal of audio data is generated, updated or applied. However, the present disclosure is not limited to those embodiments described above.

In this case, an interface for transmitting and receiving data between the first element 1101 and the second element 1102 may be defined.

For example, an application program interface (API) having training data to be applied to the training model as a factor value (or a parameter value or a delivery value) may be defined. The API may be defined as a set of sub-routines or functions which may be fetched from a protocol defined in the user terminal 100 for the purpose of any processing of the protocol defined in the intelligent server 200. That is, there may be provided an environmental in which the operation of the other protocol may be performed in one protocol through the API.

At step 1110, the first element 1101 may receive audio data. For example, the first element 1101 may receive a voice of a user and a voice and environmental sound generated from the place where the user is located as audio data.

At step 1120, the first element 1101 may request the second element 1102 to estimate the contents of the audio data.

For example, the user terminal 100 of FIG. 9 corresponding to the first element 1101 may request the intelligent server 200 of FIG. 9, corresponding to the second element 1102, to estimate the contents of the audio data while transmitting the audio data.

In accordance with an embodiment, the processor 150 of FIG. 2 included in the user terminal 100 of FIG. 2 corresponding to the first element 1101 may request the intelligent service module 149 of FIG. 2, included in the user terminal 100 of FIG. 2 corresponding to the second element 1102, to estimate the contents of the audio data while transmitting the audio data.

At step 1130, the second element 1102 may estimate the contents of the voice signal by applying the voice signal of the audio data to the training model. For example, the second element 1102 may estimate the contents of the voice using the automatic voice recognition module, the NLU module 220, etc.

At step 1140, the second element 1102 may estimate environmental information by applying the environmental sound signal of the audio data to the training model. For example, the second element 1102 may separately obtain the voice signal of the user and the environmental sound signal. Furthermore, the ASR module 210 included in the second element 1102 may estimate the contents of a voice included in the environmental sound signal other than the voice signal of the user. Furthermore, the ASR module 210 may estimate an environmental in which the user is located by estimating the pattern of the environmental sound signal.

At step 1150, the second element 1102 may generate a path rule using the contents of the voice signal and the pattern of the environmental sound signal.

At step 1160, the second element 1102 may transmit the path rule to the first element 1101. The first element 1101 may execute at least one app or function according to the received path rule.

Figure 12:
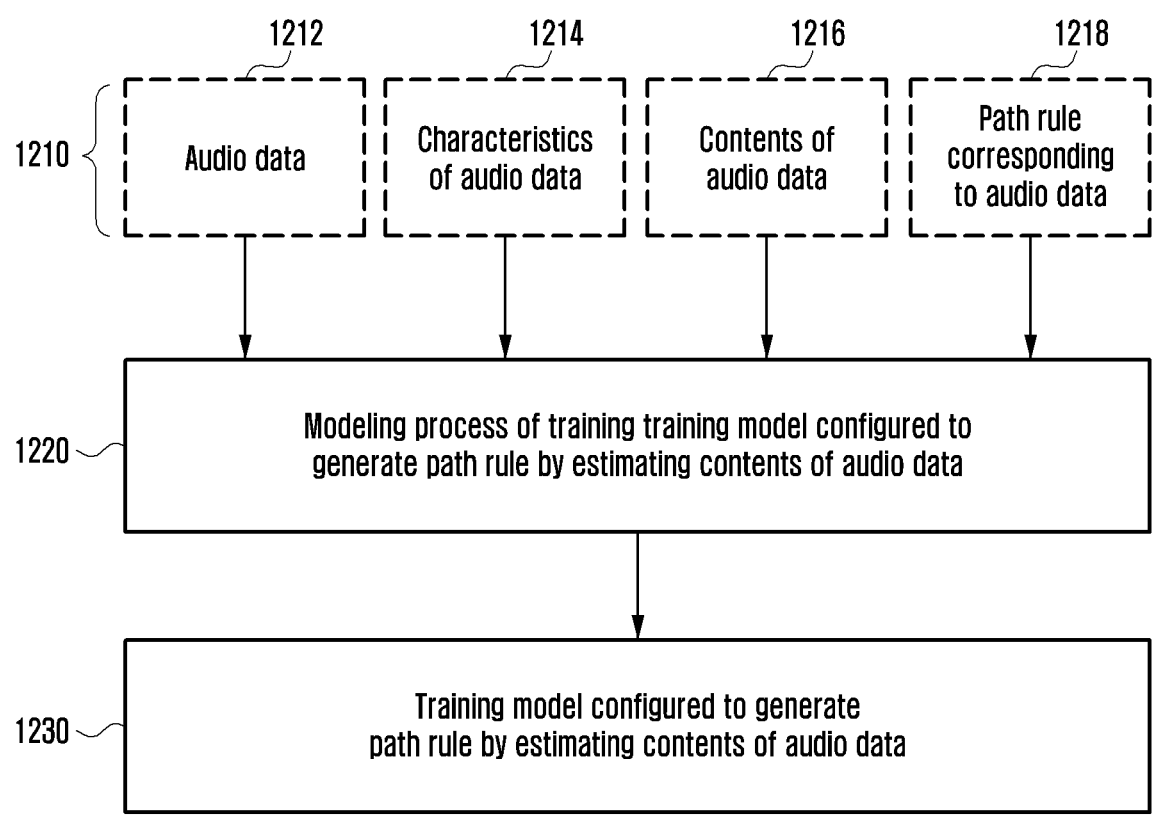
FIG. 12 is a flowchart of a method of generating a training model used in an intelligent system according to an embodiment.

FIG. 12 is a flowchart of a method of generating a training model used in the integrated intelligent system 10 according to an embodiment.

Referring to FIG. 12, the training model may be configured to estimate the contents of audio data including a voice and an environmental sound, for example, and execute an intelligent service.

The training model may include at least one of the ASR module 210, the NLU module 220, the PP module 230, the DM module 240, the NLG module 250 or the TTS module 260 of FIG. 6, for example.

The training model may include at least one of the intelligent agent 145, the intelligent service module 149 or the execution manager module 147 of FIG. 2, for example.

The integrated intelligent system 10 may implement a training model configured to estimate the contents of a voice signal and a training model configured to estimate the contents of an environmental sound signal or the pattern of the environmental sound signal into one model or may separately implement the training models.

Referring to FIG. 12, a modeling process 1220 of training a training model based on training data 1210 may be performed. In this case, the training data 1210 may include at least one of audio data 1212, the characteristics (e.g., waveform of audio data) 1214 of the audio data, the contents 1216 of the audio data, and a path rule 1218 corresponding to the audio data, for example.

The training model may identify a category of the audio data 1212. For example, a first category may be a category including a crashing sound (e.g., a collision of a vehicle or noise occurring when a building collapses). A second category may be a category including a high-pitched tone, such as a threat, a call for help, an exclamation or crying. A third category may include a category including a slang word. However, the present disclosure is not limited to those described above. For example, the training model may generate a plurality of clusters by clustering input audio data without designating a category.

For example, the training model may identify the environmental sound of the audio data 1212 to be at least one of the first category or the second category. Furthermore, the training model may identify the voice of the audio data 1212 to be at least one of the second category or the third category.

The characteristics 1214 of the audio data may be the characteristics of an audio data waveform, for example. The characteristics of the audio data waveform may indicate the high and low of the size of the audio data over time, for example.

The contents 1216 of the audio data may indicate a situation in which the audio data of each category has occurred. For example, an environmental sound belonging to the first category including a crashing sound may indicate that an accident (e.g., a vehicle collision or a building collapse) has occurred in the environment in which a user is located. An environmental sound or voice belonging to the second category including a high-pitched tone, such as a threat, a call for help, an exclamation or crying, may indicate a situation in which a user requests to be rescued. A voice belonging to the third category including a slang word may indicate a situation in which a user is threatened by others.

When the modeling process 1220 is performed, the modeling process may estimate the contents of the audio data including a vocalized environmental sound, estimate the conditions of a user as the results of the estimation, and derive a training model 1230 configured to generate a corresponding path rule.

The intelligent server 200 or the intelligent agent 145 of FIG. 2 of the user terminal 100 may estimate the conditions of a user by estimating the contents of the audio data using the above-described training model, and generate a corresponding path rule.

Figure 13:
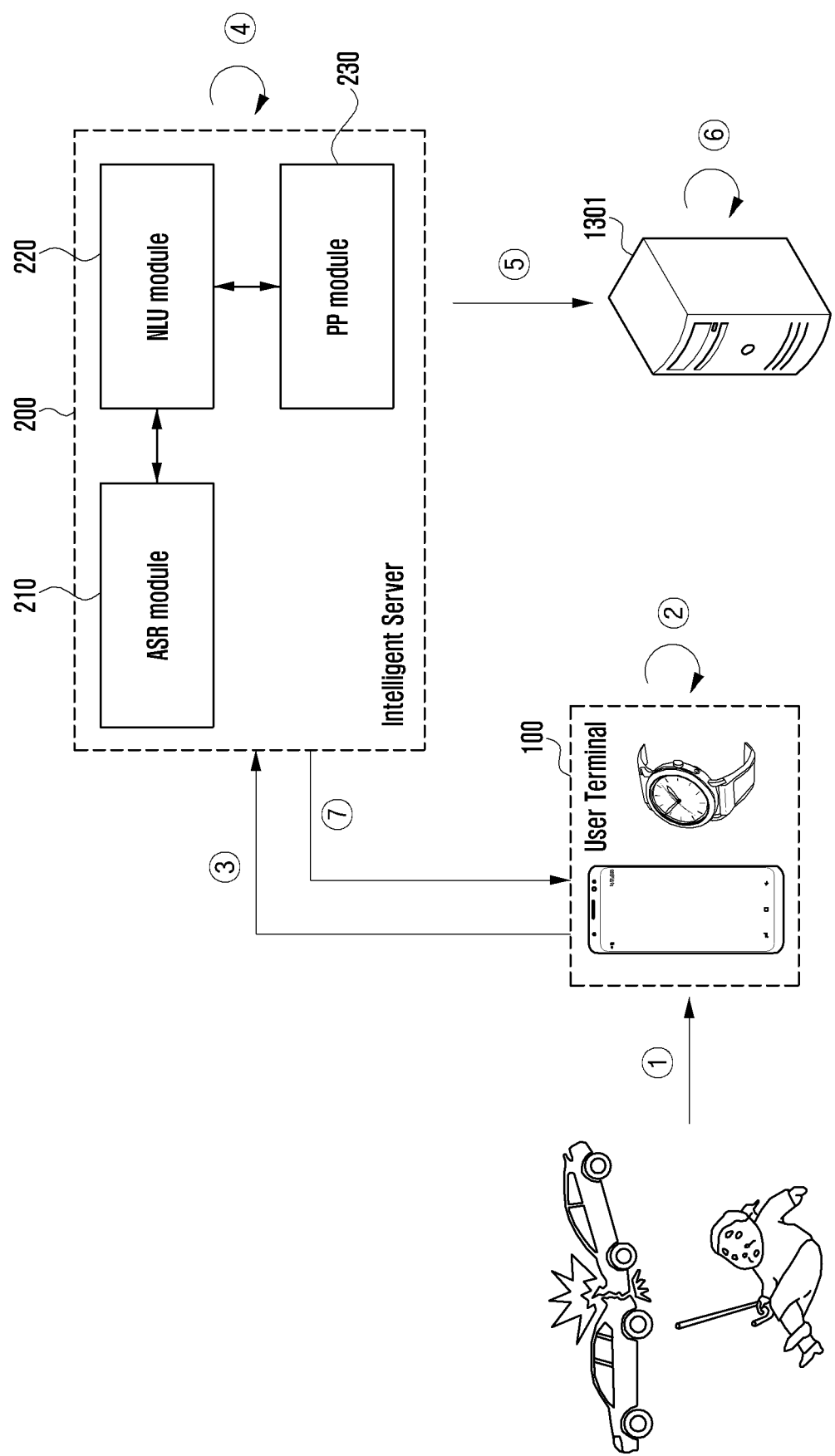
FIG. 13 is a block diagram illustrating a situation in which an intelligent service is executed in an intelligent system according to an embodiment.

FIG. 13 is a block diagram that illustrates a situation in which an intelligent service is executed in the integrated intelligent system 10 according to an embodiment.

Referring to FIG. 13, audio data for a given time (e.g., 10 to 30 seconds) among audio data received when a change in the size of audio data of the user terminal 100 exceeds a preset range may be stored. For example, a case where audio data close to 90 dB is received within a short time (e.g., 1 to 3 seconds) while audio data of about 40 dB is received may be a situation in which a change in the size of audio data is great, but the present disclosure is not limited thereto.

The user terminal 100 may receive audio data for a given time when a movement of the user terminal exceeds a preset range, and may store the received audio data. For example, when the user terminal 100 is identified to move 50 to 70 cm or more within 1 second through an acceleration sensor, a gyro sensor, etc. included in the user terminal 100, the user terminal 100 may store some of the received audio data for a given time.

At step ①, the user terminal 100 may receive a crashing sound occurring while vehicles collide or a person's exclamation of a high-pitched tone generated while the person falls. The user terminal 100 may receive a crashing sound or a high-pitched tone through a wakeup recognition module included in the intelligent agent 145 of FIG. 2. To this end, the wakeup recognition module may be implemented by a low-energy processor.

The case where a crashing sound occurs due to a collision between vehicles or a person speaks loudly due to an accident may be a case where a change in the size of audio data exceeds a preset range. Accordingly, the user terminal 100 may receive and store audio data for a set time.

The user terminal 100 may detect that the user terminal 100 moves a preset distance within a short time when a user falls. In this case, the user terminal may detect the movement of the user terminal 100 according to the falling of the user, receive audio data for a preset time, and store the received audio data.

At step ②, the user terminal 100 may generate a path rule using the received audio data.

The intelligent agent 145 of FIG. 2 included in the user terminal 100 may estimate a category of the received audio data.

The intelligent agent 145 of FIG. 2 may divide the received audio data into a voice and an environmental sound.

For example, the intelligent agent 145 of FIG. 2 may estimate that an environmental sound occurring when vehicles collide belongs to a first category including a crashing sound. Furthermore, the intelligent agent 145 of FIG. 2 may estimate that a voice (e.g., an exclamation of a high-pitched tone) made when a person falls belongs to a second category including a high-pitched tone.

The intelligent agent 145 of FIG. 2 may generate a path rule corresponding to each category. For example, the intelligent agent 145 of FIG. 2 may generate a path rule that transmits a message, providing notification of accident occurrence, to a preset target (e.g., a family).

The user terminal 100 may execute a function according to the generated path rule.

At step ③, the user terminal 100 may transmit the received audio data to the intelligent server 200 over the communication network 500.

At step ④, the intelligent server 200 may estimate the category of the audio data. In accordance with an embodiment, the intelligent server 200 may divide the received audio data into a voice and an environmental sound and estimate respective categories. For example, the NLU module 220 of the intelligent server 200 may estimate that an environmental sound occurring when vehicles collide belongs to a first category including a crashing sound. Furthermore, the NLU module 220 may estimate that a voice (e.g., an exclamation of a high-pitched tone) made when a person falls belongs to a second category including a high-pitched tone.

The NLU module 220 may generate a path rule corresponding to each category. For example, the NLU module 220 may notify a preset target of accident occurrence information.

At step ⑤, the intelligent server 200 may transmit accident occurrence information to a server 1301 (e.g., a fire station or police station located at a place adjacent to an accident occurrence area) managed by a company that supports an emergency rescue service. The intelligent server 200 may transmit accident occurrence information to a server that provides information related to traffic information.

At step ⑥, the server 1301 may perform an emergency rescue service or update traffic guidance information based on the received information. Furthermore, the intelligent server 200 may transmit accident occurrence information to various devices (e.g., a smartphone and a connected car) located at places adjacent to an accident occurrence area.

At step ⑦, the intelligent server 200 may provide guidance to a user by transmitting operations executed according to the path rule generated by the intelligent server 200 to the user terminal 100.

Figure 14:
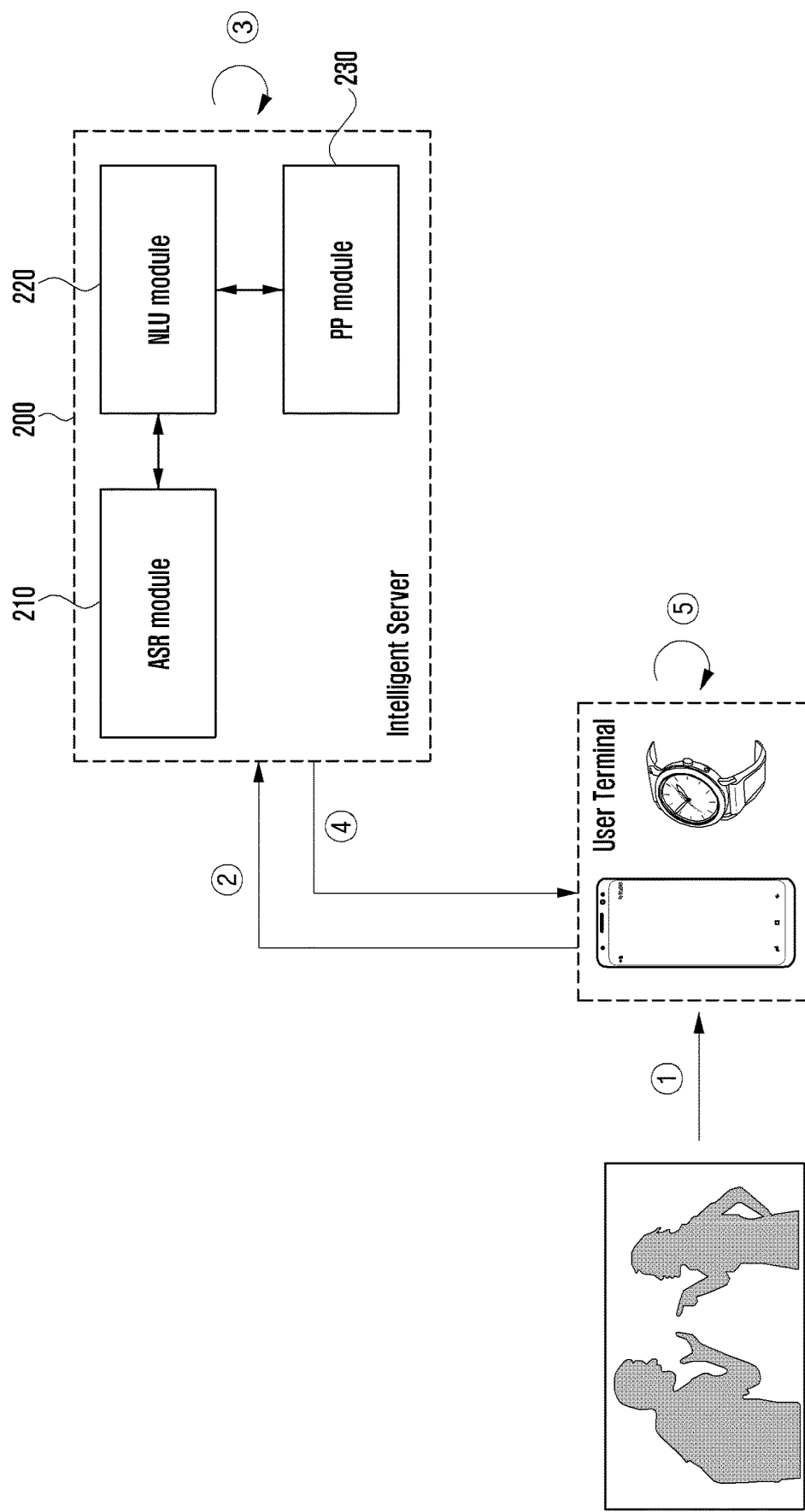
FIG. 14 is a block diagram illustrating a situation in which an intelligent service is executed in an intelligent system according to an embodiment.

FIG. 14 is a block diagram illustrating a situation in which an intelligent service is executed in the integrated intelligent system 10 according to an embodiment.

Referring to FIG. 14, at step ①, the user terminal 100 may receive audio data.

The user terminal 100 may receive audio data for a given time when a preset word or sentence is received, and may store the received audio data.

For example, the user terminal 100 may store audio data for a given time among audio data received in the situation in which a preset slang word is received.

At step ②, the user terminal 100 may transmit the received audio data to the intelligent server 200 over the communication network 500.

At step ③, the intelligent server 200 may generate a path rule using the received audio data.

The ASR module 210 of the intelligent server 200 may identify a voice and an environmental sound in the audio data. The ASR module 210 may convert the identified voice in the form of text data. For example, a speech recognition module included in the ASR module 210 may convert the received voice and environmental sound in the form of text data using speech and phoneme information included in the received voice and information on a combination of the phoneme information.

The NLU module 220 of the intelligent server 200 may confirm the contents of a voice by performing syntax analysis or semantic analysis on the text data.

The NLU module 220 may generate one path rule or a plurality of path rules based on the contents of the voice. For example, the NLU module 220 may generate a path rule that executes a recording app. The NLU module 220 may generate a path rule that executes a camera app.

The PP module 230 may select at least one of the plurality of path rules.

The PP module 230 may select a path rule, corresponding to information (e.g., app use information, posture information of the terminal) of the user terminal 100 received from the intelligent agent 145 of FIG. 2 of the user terminal 100, and may transmit the path rule to the NLU module 220. For example, the PP module 230 may receive information on the terminal of a user located in a dark environmental, such as a bag or a pocket, and may select a path rule that executes a recording app. The PP module 230 may transmit the selected path rule to the NLU module 220.

At step ④, the intelligent server 200 may transmit the selected path rule to the user terminal 100.

At step ⑤, the user terminal 100 may execute a recording app according to the received path rule and start audio data recording.

The user terminal 100 may perform the above-described process without operating in conjunction with the intelligent server 200 using the intelligent agent 145 of FIG. 2 included in the user terminal 100, the intelligent service module 149 of FIG. 2, and the execution manager module 147.

Figure 15:
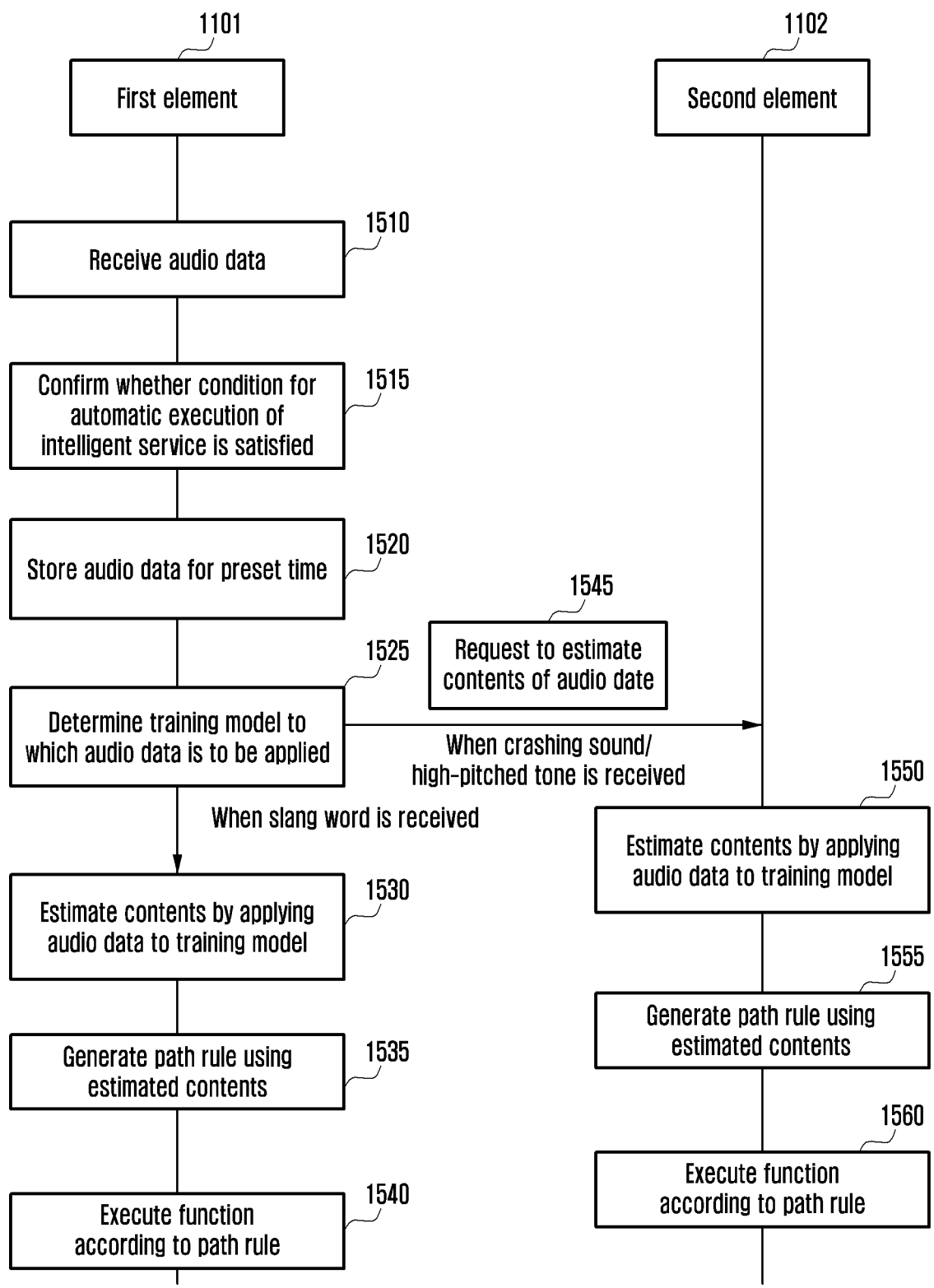
FIG. 15 is a flowchart of a method in which an intelligent service is executed using audio data input to a user terminal in an integrated intelligence system according to an embodiment.

FIG. 15 is a flowchart of a method in which an intelligent service is executed using audio data input to a user terminal in the integrated intelligence system 10 according to an embodiment.

Referring to FIG. 15, at step 1510, a first element 1101 may receive audio data including a voice and an environmental sound.

At step 1515, the first element 1101 may confirm whether the received audio data satisfies the automatic execution condition of an intelligent service. For example, when the size of the received audio data exceeds a preset value or a preset word or sentence is received, the first element 1101 may confirm that the automatic execution condition is satisfied. Furthermore, when the user terminal 100 moves a set distance or more for a short time, the first element 1101 may confirm that the automatic execution condition is satisfied.

At step 1520, when the condition for the automatic execution of the intelligent service is satisfied, the first element 1101 may store audio data for a set time.

At step 1525, the first element 1101 may determine a training model to which the audio data will be applied.

The user terminal 100 of FIG. 9 corresponding to the first element 1101 may identify a voice and an environmental sound included in the audio data. For example, the user terminal 100 of FIG. 9 may identify a crashing sound included in the audio data to be an environmental sound and identify a slang word and a high-pitched tone to be a voice.

At step 1530, when a slang word is received and an intelligent service is automatically executed, the first element 1101 may estimate the contents of the stored audio data (e.g., a slang word) by applying the stored audio data to a training model. The first element 1101 according to an embodiment may convert the slang word into text data, may confirm the contents of the voice by performing syntax analysis or semantic analysis on the text data, and may estimate a category of the slang word.

At step 1535, the first element 1101 may generate a path rule based on the estimated contents and the category of the slang word. For example, the first element 1101 may generate a path rule that executes a recording app.

At step 1540, the first element 1101 may execute a function according to the path rule. For example, the first element 1101 may execute a recording app.

At step 1545, when a crashing sound or an exclamation of a high-pitched tone is received and an intelligent service is automatically executed, the first element 1101 may request the second element 1102 to estimate the audio data (e.g., a crashing sound or a high-pitched tone).

At step 1550, the second element 1102 may estimate the contents of the crashing sound or a high-pitched tone by applying the audio data to a training model. The second element 1102 according to an embodiment may estimate a category of the crashing sound or a high-pitched tone.

At step 1555, the second element 1102 may generate a path rule using the estimated contents. For example, the second element 1102 may generate a path rule based on a category of the crashing sound or a high-pitched tone. For example, the second element 1102 may generate a path rule that notifies a preset target (e.g., a fire station, a police station, traffic information center) of information on accident occurrence. At step 1560, the second element 1102 may execute a function according to the path rule. For example, the second element 1102 may notify a fire station, etc. of accident occurrence.

Figure 16:
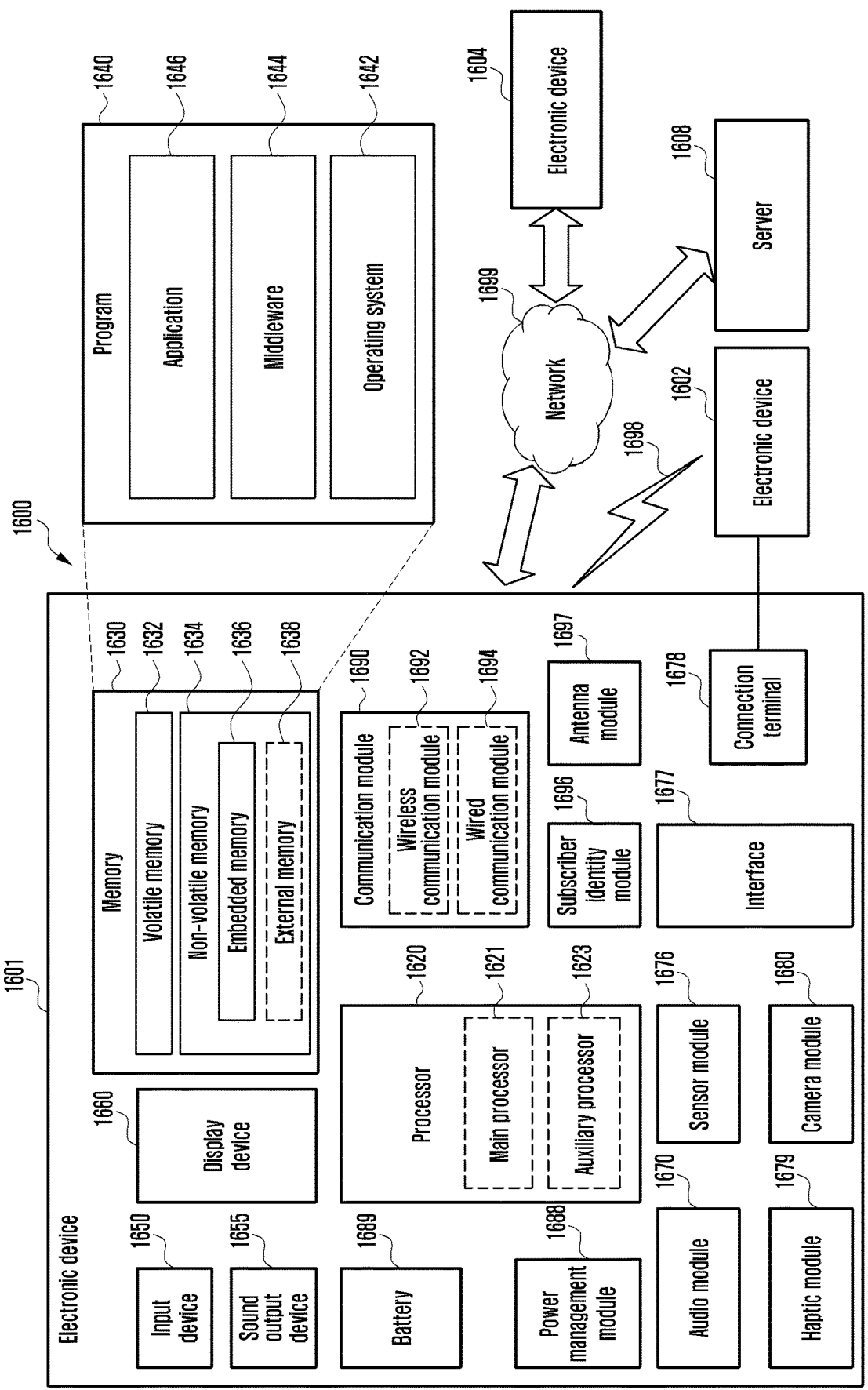
FIG. 16 is a block diagram of an electronic device within a network environment according to an embodiment.

FIG. 16 is a block diagram illustrating an electronic device 1601 in a network environmental 1600 according to an embodiment.

Referring to FIG. 16, the electronic device 1601 in the network environmental 1600 may communicate with an electronic device 1602 via a first network 1698 (e.g., a short-range wireless communication network), or an electronic device 1604 or a server 1608 via a second network 1699 (e.g., a long-range wireless communication network).

According to an embodiment, the electronic device 1601 may communicate with the electronic device 1604 via the server 1608. The electronic device 1601 may include a processor 1620, a memory 1630, an input device 1650, a sound output device 1655, a display device 1660, an audio module 1670, a sensor module 1676, an interface 1677, a connection terminal 1678, a haptic module 1679, a camera module 1680, a power management module 1688, a battery 1689, a communication module 1690, a subscriber identification module (SIM) 1696, or an antenna module 1697. At least one (e.g., the display device 1660 or the camera module 1680) of the components may be omitted from the electronic device 1601, or one or more other components may be added to the electronic device 1601. Some of the components may be implemented as single integrated circuitry. For example, the sensor module 1676 (e.g., a fingerprint sensor, an iris sensor, or an illuminance sensor) may be implemented as embedded in the display device 1660.

The processor 1620 may execute, for example, software (e.g., a program 1640) to control at least one other component (e.g., a hardware or software component) of the electronic device 1601 coupled with the processor 1620, and perform various data processing or computation. As at least part of the data processing or computation, the processor 1620 may load a command or data received from another component (e.g., the sensor module 1676 or the communication module 1690) in volatile memory 1632, process the command or the data stored in the volatile memory 1632, and store resulting data in non-volatile memory 1634. The processor 1620 may include a main processor 1621 (e.g., a CPU or an AP), and an auxiliary processor 1623 (e.g., a GPU, an image signal processor (ISP), a sensor hub processor, or a communication processor (CP)) that is operable independently from, or in conjunction with, the main processor 1621. Additionally or alternatively, the auxiliary processor 1623 may be adapted to consume less power than the main processor 1621, or to be specific to a specified function. The auxiliary processor 1623 may be implemented as separate from, or as part of the main processor 1621.

The auxiliary processor 1623 may control at least some of the functions or states related to at least one component (e.g., the display device 1660, the sensor module 176, or the communication module 1690) among the components of the electronic device 1601, instead of the main processor 1621 while the main processor 1621 is in an inactive (e.g., sleep) state, or together with the main processor 1621 while the main processor 1621 is in an active state (e.g., executing an application). According to an embodiment, the auxiliary processor 1623 (e.g., an ISP or a CP) may be implemented as part of another component (e.g., the camera module 180 or the communication module 1690) functionally related to the auxiliary processor 1623.

The memory 1630 may store various data used by at least one component (e.g., the processor 1620 or the sensor module 1676) of the electronic device 1601. The various data may include, for example, software (e.g., the program 1640) and input data or output data for a command related thereto. The memory 1630 may include the volatile memory 1632 or the non-volatile memory 1634.

The program 1640 may be stored in the memory 1630 as software, and may include, for example, an OS 1642, middleware 1644, or an application 1646.

The input device 1650 may receive a command or data to be used by another component (e.g., the processor 1620) of the electronic device 1601, from the outside (e.g., a user) of the electronic device 1601. The input device 1650 may include, for example, a microphone, a mouse, or a keyboard.

The sound output device 1655 may output sound signals to the outside of the electronic device 1601. The sound output device 1655 may include, for example, a speaker or a receiver. The speaker may be used for general purposes, such as playing multimedia or playing a record, and the receiver may be used for receiving incoming calls. The receiver may be implemented as separate from, or part of, the speaker.

The display device 1660 may visually provide information to the outside (e.g., a user) of the electronic device 1601. The display device 1660 may include, for example, a display, a hologram device, or a projector and control circuitry to control a corresponding one of the display, hologram device, and projector. The display device 1660 may include touch circuitry adapted to detect a touch, or sensor circuitry (e.g., a pressure sensor) adapted to measure the intensity of force incurred by the touch.

The audio module 1670 may convert a sound into an electrical signal and vice versa. According to an embodiment, the audio module 1670 may obtain the sound via the input device 1650, or output the sound via the sound output device 1655 or a headphone of an external electronic device 1602 directly (e.g., wiredly) or wirelessly coupled with the electronic device 1601.

The sensor module 1676 may detect an operational state (e.g., power or temperature) of the electronic device 1601 or an environmental state (e.g., a state of a user) external to the electronic device 1601, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1677 may support one or more specified protocols to be used for the electronic device 1601 to be coupled with the electronic device 1602 directly (e.g., wiredly) or wirelessly. According to an embodiment, the interface 1677 may include, for example, a high definition multimedia interface (HDMI), a universal serial bus (USB) interface, a secure digital (SD) card interface, or an audio interface.

A connection terminal 1678 may include a connector via which the electronic device 101 may be physically connected with the external electronic device 1602. According to an embodiment, the connection terminal 1678 may include, for example, an HDMI connector, a USB connector, an SD card connector, or an audio connector (e.g., a headphone connector), The haptic module 1679 may convert an electrical signal into a mechanical stimulus (e.g., a vibration or a movement) or an electrical stimulus which may be recognized by a user via his tactile sensation or kinesthetic sensation. According to an embodiment, the haptic module 1679 may include, for example, a motor, a piezoelectric element, or an electric stimulator.

The camera module 1680 may capture a still image or moving images. The camera module 1680 may include one or more lenses, image sensors, image signal processors, or flashes.

The power management module 1688 may manage power supplied to the electronic device 1601. The power management module 1688 may be implemented as at least part of, for example, a power management integrated circuit (PMIC).

The battery 1689 may supply power to at least one component of the electronic device 1601. The battery 1689 may include, for example, a primary cell which is not rechargeable, a secondary cell which is rechargeable, or a fuel cell.

The communication module 1690 may support establishing a direct (e.g., wired) communication channel or a wireless communication channel between the electronic device 1601 and the electronic device 1602, the electronic device 1604, or the server 1608 and performing communication via the established communication channel. The communication module 1690 may include one or more communication processors that are operable independently from the processor 1620 (e.g., the AP) and supports a direct (e.g., wired) communication or a wireless communication. The communication module 1690 may include a wireless communication module 1692 (e.g., a cellular communication module, a short-range wireless communication module, or a global navigation satellite system (GNSS) communication module) or a wired communication module 1694 (e.g., a local area network (LAN) communication module or a power line communication (PLC) module). A corresponding one of these communication modules may communicate with the external electronic device via the first network 1698 (e.g., a short-range communication network, such as Bluetooth®, wireless-fidelity (Wi-Fi) direct, or a standard of the Infrared Data Association (IrDA)) or the second network 1699 (e.g., a long-range communication network, such as a cellular network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 1692 may identify and authenticate the electronic device 1601 in the communication network 500, such as the first network 1698 or the second network 1699, using subscriber information (e.g., international mobile subscriber identity (IMSI)) stored in the subscriber identification module 1696.

The antenna module 1697 may transmit or receive a signal or power to or from the outside (e.g., the external electronic device) of the electronic device 1601. The antenna module 1697 may include one or more antennas, and, therefrom, at least one antenna appropriate for a communication scheme used in the communication network 500, such as the first network 1698 or the second network 1699, may be selected, for example, by the communication module 1690 (e.g., the wireless communication module 1692). The signal or the power may then be transmitted or received between the communication module 1690 and the external electronic device via the selected at least one antenna.

At least some of the above-described components may be coupled mutually and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to an embodiment, commands or data may be transmitted or received between the electronic device 1601 and the external electronic device 1604 via the server 1608 coupled with the second network 1699. Each of the electronic devices 1602 and 1604 may be a device of a same type as, or a different type, from the electronic device 1601. All or some of the operations to be executed at the electronic device 1601 may be executed at one or more of the external electronic devices 1602, 1604, or 1608. For example, if the electronic device 1601 should perform a function or a service automatically, or in response to a request from a user or another device, the electronic device 1601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of performing the at least part of the function or the service to the electronic device 1601. The electronic device 1601 may provide the outcome, with or without further processing of the outcome, as at least part of a reply to the request. To that end, a cloud computing, distributed computing, or client-server computing technology may be used, for example.

The electronic device according to an embodiment may be one of various types of electronic devices. The electronic devices may include, for example, a portable communication device (e.g., a smart phone), a computer device, a portable multimedia device, a portable medical device, a camera, a wearable device, or a home appliance. The electronic devices are not limited to those described above.

It should be appreciated that the present disclosure and the terms used therein are not intended to be limited to a particular embodiment but include various changes, equivalents, or replacements for a corresponding embodiment. With regard to the description of the accompanying drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "$1^{st}$," "2nd," "first," and "second" may be used to simply distinguish a corresponding component from another component, but is not intended to limit the components in another aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". The term "module" may indicate a single integral component, or a minimum unit or part thereof, adapted to perform one or more functions. For example, according to an embodiment, the term "module" may indicate a device implemented in a form of an application-specific integrated circuit (ASIC).

An embodiment as set forth herein may be implemented as software (e.g., the program 1640) including one or more instructions that are stored in a non-transitory machine-readable storage medium (e.g., the internal memory 1636 or the external memory 1638) that is readable by a machine (e.g., the electronic device 1601). For example, a processor 1620 of the electronic device 1601 may invoke at least one of the one or more instructions stored in the storage medium, and execute the one or more instructions, with or without using one or more other components under the control of the processor. This allows the machine to be operated to perform at least one function according to the at least one instruction invoked. The one or more instructions may include code made by a complier or code executable by an interpreter. The machine-readable storage medium may be provided in the form of a non-transitory machine-readable storage medium. Wherein, the term "non-transitory" simply indicates that the storage medium is a tangible device, but does not include a signal (e.g., an electromagnetic wave), and does not differentiate between where data is semi-permanently stored in the storage medium and where the data is temporarily stored in the storage medium.

A method according to an embodiment of the present disclosure may be included and provided in a computer program product. The computer program product may be traded as a product between a seller and a buyer. The computer program product may be distributed in the form of a machine-readable storage medium (e.g., compact disc read only memory (CD-ROM)), online (e.g., downloaded or uploaded) via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

While the present disclosure has been shown and described with reference to certain embodiments thereof, it will be understood by those skilled in the art that various changes in form and details may be made therein without departing from the scope of the present disclosure as defined by the appended claims and their equivalents.

What is claimed is:

1. A system, comprising:
    a communication interface;
    at least one processor operatively coupled to the communication interface; and
    at least one memory operatively coupled to the at least one processor,
    wherein the at least one memory is configured to store instructions configured for the at least one processor to:
        receive sound data from a first external device through the communication interface,
        obtain a voice signal and a noise signal from the sound data using at least some of an automatic voice recognition module,
        change the voice signal into text data,
        determine a noise pattern based on at least some of the noise signal,
        determine a domain using the text data and the noise pattern when the at least one memory operates, and
        determine a sequence of states for enabling the first external device to perform a first task related to the voice signal and the noise signal.

2. The system of claim 1, wherein the at least one memory is further configured to store instructions configured for the at least one processor to determine intent based on at least some of the text data when the memory operates.

3. The system of claim 2, wherein the at least one memory is further configured to store instructions configured for the at least one processor to provide the sequence of the states to the first external device through the communication interface when the memory operates.

4. The system of claim 2, wherein the at least one memory is further configured to store instructions configured for the at least one processor to determine the sequence of the states for enabling a second external device to perform the task related to the voice signal when the memory operates.

5. The system of claim 4, wherein the at least one memory is further configured to store instructions configured for the at least one processor to provide the sequence of the states to the first external device through the communication interface when the memory operates.

6. A user terminal, comprising:
    an input module;
    memory; and
    a processor,
    wherein the memory is configured to store instructions configured for the processor to:
        generate a path rule obtained by estimating contents of audio data by applying the audio data, comprising a voice signal and an environmental sound signal received through the input module, to a training model trained using an artificial intelligent algorithm, wherein the training model is configured to generate the path rule using a pattern of the environmental sound signal obtained from the environmental sound signal, and
    wherein the training model is configured to generate the path rule by estimating the contents of the audio data trained using at least one of the audio data, the contents of the audio data, characteristics of the audio data, and a path rule corresponding to the audio data as training data.

7. The user terminal of claim 6, wherein:
    the user terminal further comprises a communication unit,
    wherein the memory is further configured to store instructions configured for the processor to control the communication unit to transmit the audio data received through the input module to an external device and for the processor to execute a function according to the path rule when the path rule obtained by applying the audio data to the training model stored in the external device is received from the external device through the communication unit, and
    wherein the training model is further configured to generate the path rule based on contents estimated from the voice signal and the pattern of the environmental sound signal obtained from the environmental sound.

8. The user terminal of claim 6, wherein the memory is further configured to store instructions configured for the processor to change contents of at least one action included in the path rule using the pattern of the environmental sound signal in a situation in which the pattern of the environmental sound signal estimated from the environmental sound signal is used.

9. The user terminal of claim 6, wherein the memory is further configured to store instructions configured for the processor to generate another path rule in addition to the path rule using the pattern of the environmental sound signal in a situation in which the pattern of the environmental sound signal estimated from the environmental sound signal is used.

10. The user terminal of claim 6, wherein the memory is further configured so that the processor applies the audio data to the training model in at least one situation in which a preset distance is moved within a preset time, a size of the received audio data exceeds a preset size, or a preset word or sentence is identified to be included in the received audio data.

11. A method of a system, comprising:
receiving sound data from a first external device;
obtaining a voice signal and a noise signal from the sound data;
changing the voice signal into text data;
determining a noise pattern based on at least some of the noise signal;
determining a domain using the text data and the noise pattern; and
determining a sequence of states for enabling the first external device to perform a first task related to the voice signal and the noise signal.

12. The method of claim 11, further comprising determining intent based on at least some of the text data.

13. The method of claim 12, further comprising providing the sequence of the states to the first external device.

14. The method of claim 12, further comprising determining a sequence of states for enabling a second external device to perform a task related to the voice signal.

15. The method of claim 14, further comprising providing the sequence of the states to the first external device.

16. A method of a user terminal, comprising;
receiving audio data comprising a voice and an environmental sound; and
generating a path rule using a pattern of the environmental sound signal obtained from the environmental sound signal in a situation in which the path rule is obtained by estimating contents of the audio data by applying the audio data to a training model,
wherein the training model is configured to generate the path rule by estimating the contents of the audio data applied to the training model using at least one of the audio data, the contents of the audio data, characteristics of the audio data, and the path rule corresponding to the audio data as training data.

17. The method of claim 16, further comprising:
transmitting the audio data to an external device;
executing a function according to the path rule when the path rule obtained by applying the audio data to the training model stored in the external device is received from the external device,
wherein the training model is further configured to generate the path rule based on contents estimated from the voice signal and a pattern of the environmental sound signal obtained from the environmental sound.

18. A computer program product comprising a non-transitory computer-readable recording medium in which instructions for executing operations in a computer are stored, wherein the operations comprise:
receiving sound data from a first external device;
obtaining a voice signal and a noise signal from the sound data;
changing the voice signal into text data;
determining a noise pattern based on at least some of the noise signal;
determining a domain using the text data and the noise pattern; and
determining a sequence of states for enabling the first external device to perform a first task related to the voice signal and the noise signal.

* * * * *